(12) United States Patent
Tanaka et al.

(10) Patent No.: US 8,200,065 B2
(45) Date of Patent: *Jun. 12, 2012

(54) INTEGRATED CIRCUIT OR USE IN PLAYBACK APPARATUS

(75) Inventors: Keiichi Tanaka, Kadoma (JP); Masahiro Oashi, Kadoma (JP); Tomokazu Kanamaru, Kadoma (JP)

(73) Assignee: Panasonic Corporation, Osaka (JP)

( * ) Notice: Subject to any disclaimer, the term of this patent is extended or adjusted under 35 U.S.C. 154(b) by 220 days.

This patent is subject to a terminal disclaimer.

(21) Appl. No.: 12/426,539

(22) Filed: Apr. 20, 2009

(65) Prior Publication Data
US 2009/0202228 A1 Aug. 13, 2009

Related U.S. Application Data

(63) Continuation of application No. 11/568,862, filed as application No. PCT/JP2005/008488 on May 10, 2005.

(30) Foreign Application Priority Data

May 11, 2004 (JP) ................................. 2004-141560

(51) Int. Cl.
*H04N 9/80* (2006.01)
*H04N 5/93* (2006.01)
*H04N 5/935* (2006.01)
(52) U.S. Cl. ......... 386/248; 386/201; 386/353; 386/357
(58) Field of Classification Search .................. 386/248, 386/201, 353, 357, E5.064
See application file for complete search history.

(56) References Cited

U.S. PATENT DOCUMENTS
6,816,415 B2 11/2004 Nakajima et al.
(Continued)

FOREIGN PATENT DOCUMENTS
EP 1073051 1/2001
(Continued)

OTHER PUBLICATIONS

U.S.A. Office action (U.S. Appl. No. 11/568,862), mail date is Dec. 9, 2010.
(Continued)

*Primary Examiner* — Thai Tran
*Assistant Examiner* — Syed Hasan
(74) *Attorney, Agent, or Firm* — Greenblum & Bernstein, P.L.C.

(57) ABSTRACT

An integrated circuit includes a storage that stores a module that has a function of a virtual machine for executing an application recorded on a recording medium. The integrated circuit also includes a central processing unit that executes the module to cause the virtual machine to function and a decoder, that is distinct from the central processing unit, that decodes a video stream and an audio stream that are included in digital streams stored on a recording media. When the central processing unit executes the module, a package manager manages status information of the digital streams. If at least one of the digital streams is in an enable status, the decoder decodes the digital stream. When the decoder decodes the digital stream, the package manager changes the status information of another digital stream to an enable status or a disable status according to a request from the application.

3 Claims, 33 Drawing Sheets

U.S. PATENT DOCUMENTS

| | | |
|---|---|---|
| 6,850,273 B1 | 2/2005 | Yoshida et al. |
| 2002/0194618 A1 | 12/2002 | Okada et al. |
| 2003/0179606 A1 | 9/2003 | Nakajima et al. |
| 2004/0158800 A1 | 8/2004 | Jung et al. |
| 2004/0165070 A1 | 8/2004 | Yoshida et al. |
| 2004/0190405 A1 | 9/2004 | Tsumagari et al. |
| 2005/0131858 A1 | 6/2005 | Seo et al. |
| 2006/0098936 A1* | 5/2006 | Ikeda et al. ............... 386/46 |
| 2006/0136815 A1 | 6/2006 | Jung et al. |
| 2006/0146660 A1 | 7/2006 | Ikeda et al. |
| 2007/0086727 A1 | 4/2007 | Tanaka et al. |
| 2007/0223876 A1 | 9/2007 | Hashimoto et al. |
| 2007/0253679 A1 | 11/2007 | Tanaka et al. |
| 2007/0286575 A1 | 12/2007 | Oashi et al. |
| 2008/0031601 A1 | 2/2008 | Hashimoto et al. |
| 2008/0145031 A1 | 6/2008 | Tanaka et al. |
| 2008/0285947 A1 | 11/2008 | Hashimoto et al. |
| 2009/0202228 A1 | 8/2009 | Tanaka et al. |
| 2010/0046921 A1 | 2/2010 | Tanaka et al. |
| 2010/0046923 A1 | 2/2010 | Ikeda et al. |
| 2010/0046924 A1 | 2/2010 | Ikeda et al. |

FOREIGN PATENT DOCUMENTS

| | | |
|---|---|---|
| EP | 1437739 | 7/2004 |
| JP | 2002-295562 | 10/2000 |
| JP | 2001-043139 | 2/2001 |
| JP | 2002-056612 | 2/2002 |
| JP | 2002-369154 | 12/2002 |
| JP | 2003-308645 | 10/2003 |
| JP | 2004-221765 | 8/2004 |
| JP | 4351248 | 10/2009 |
| JP | 2009-266382 | 11/2009 |
| JP | 2011-103170 | 5/2011 |
| TW | 200403559 | 3/2004 |
| TW | 200404283 | 3/2004 |
| WO | 2004/030356 | 4/2004 |
| WO | 2004/034395 | 4/2004 |
| WO | 2005/055206 | 6/2005 |

OTHER PUBLICATIONS

English Language Abstract of JP 2003-308645.
English Language Abstract of JP 2002-369154.
English Language Abstract of JP 2004-2217765.
Japan Office action, mail date is Oct. 19, 2010.
Search report from E.P.O., mail date is Dec. 12, 2011.
Australia Office action, mail date is Jan. 7, 2011.
Taiwan Office action, mail date is Jul. 18, 2011.
Taiwan Office action, mail date is Sep. 22, 2011.
Japan (JP Appl. No. 2010-279420) Office action, mail date is Jan. 31, 2012.
Japan (JP Appl. No. 2010-279421) Office action, mail due is Jan. 31, 2012.

* cited by examiner

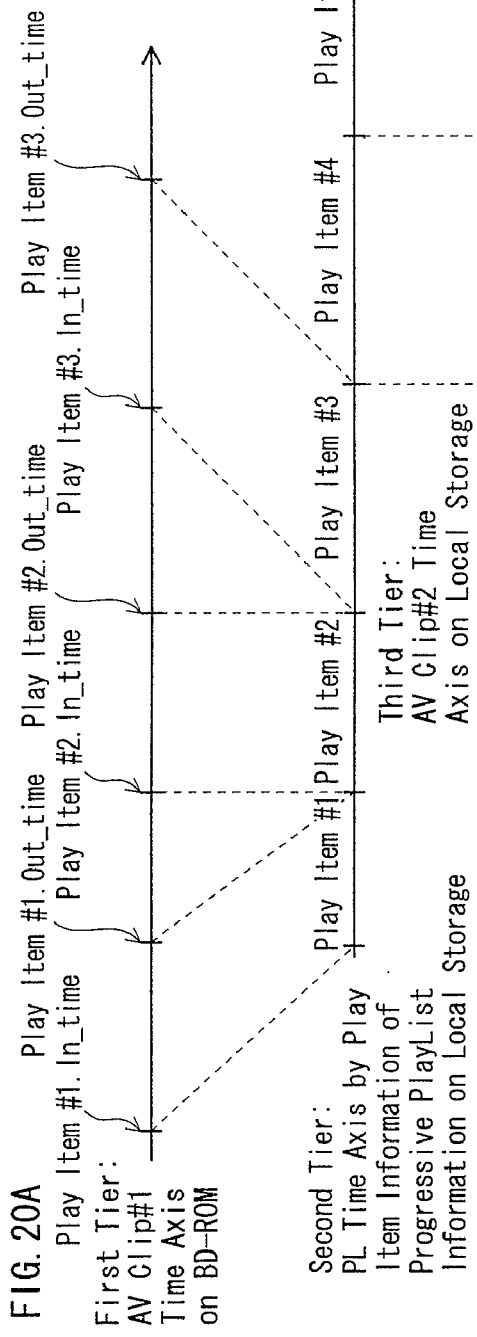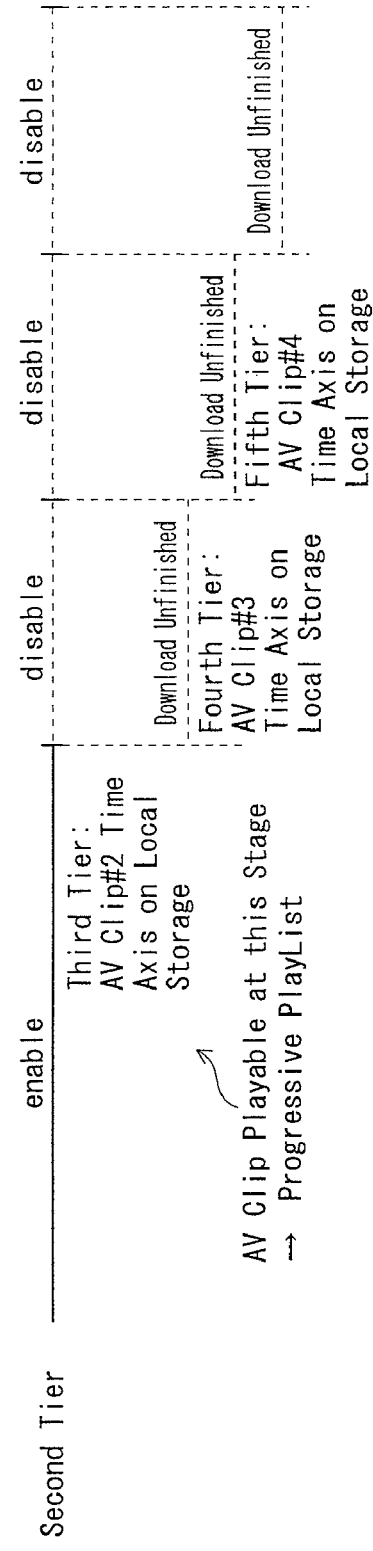
FIG. 20A
FIG. 20B

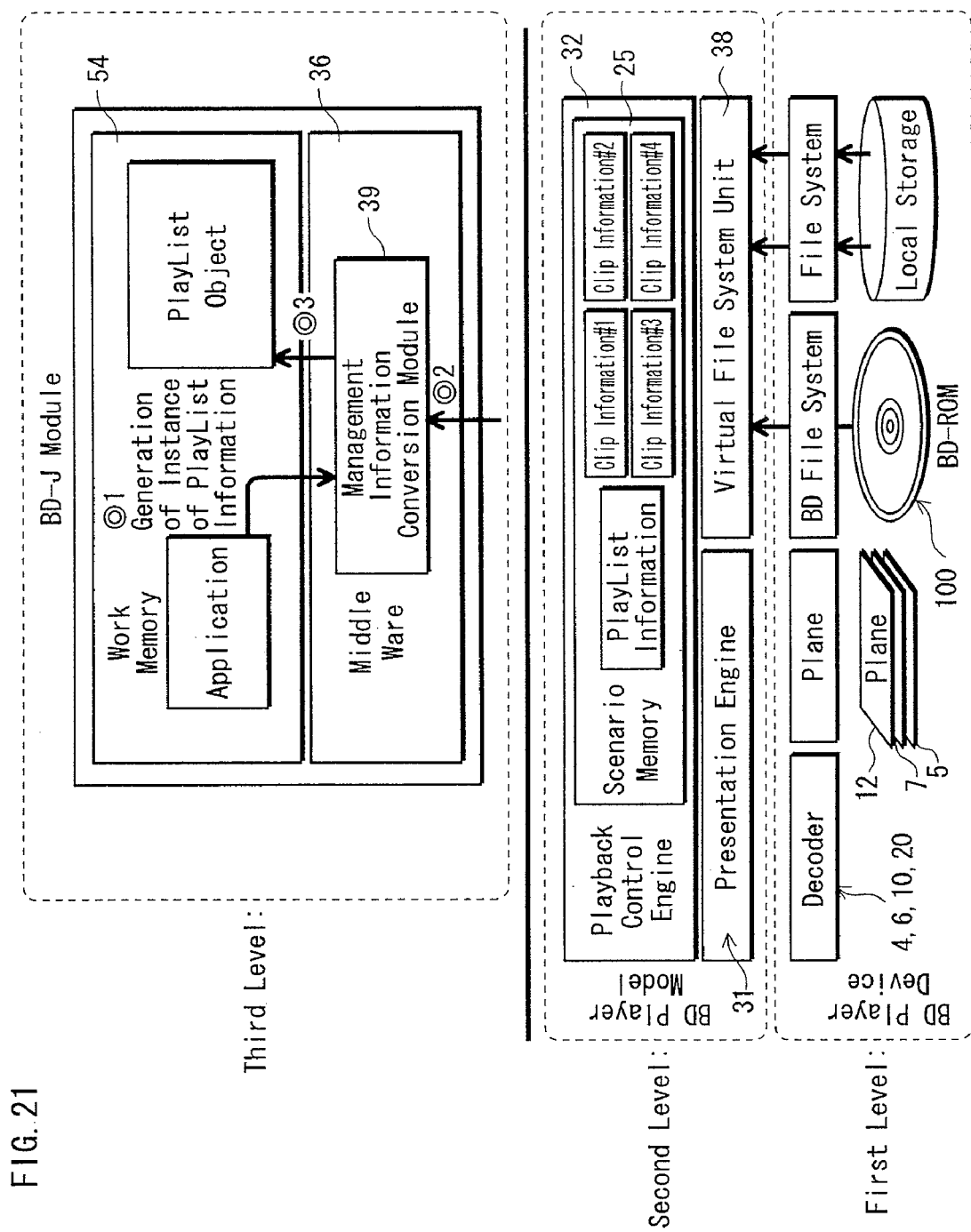

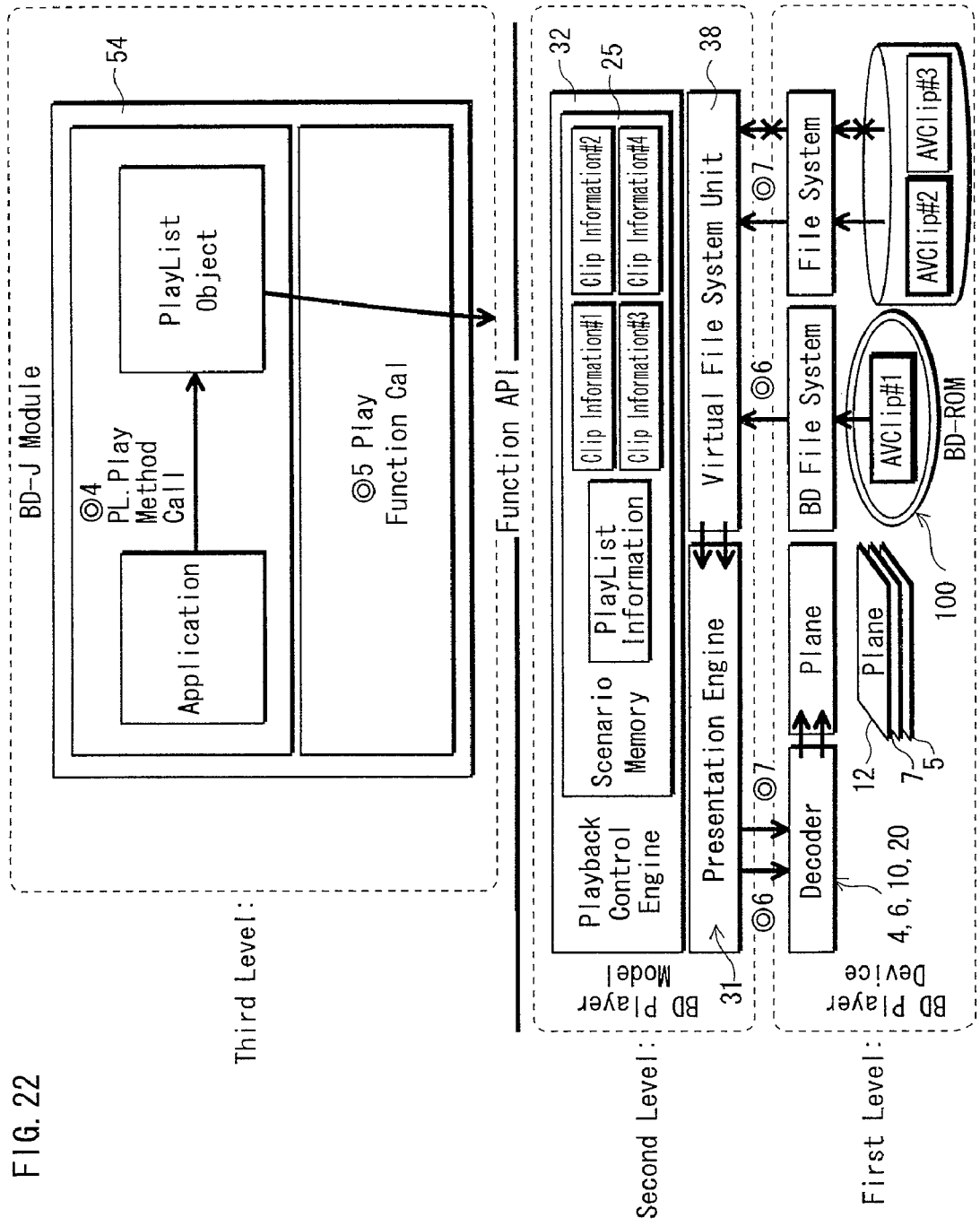

FIG. 27A

- Procedure of enable Clip Method Argument = ID of AV Clip
- S14: Specify AV Clip y to be made enable from Argument at the time of Call
- S15: Is AV Clip y Absent on Local Storage?
  - YES → S19: Return with False Response
  - NO → S16: Is File Path Written in Stream Storage Information File?
    - NO → S19: Return with False Response
    - YES → S17: Set AV Clip y to Enable Status and Read Only Mode
      - S18: Return with Success Response

FIG. 27B

- Procedure of disable Clip Method Argument = ID of AV Clip
- S21: Specify AV Clip y to be made disable from Argument at the time of Call
- S22: Is AV Clip y being Played?
  - YES → S26: Return with False Response
  - NO → S23: Is File Path of AV Clip y Written in Stream Storage Information File?
    - NO → S26: Return with False Response
    - YES → S24: Set AV Clip y to Disable Status and Cancel Read Only Mode
      - S25: Return with Success Response

INTEGRATED CIRCUIT OR USE IN PLAYBACK APPARATUS

CROSS-REFERENCE TO RELATED APPLICATIONS

The present application is a Continuation of co-pending U.S. patent application Ser. No. 11/568,862, filed Nov. 9, 2006, which is a U.S. National Stage Application of International Application No. PCT/JP05/008488 filed on May 10, 2005 which claims priority of Japanese Patent Application No. 2004/141560 filed May 11, 2004. The international application was not published in English. The disclosure of each of these documents is expressly incorporated by reference herein in their entireties.

TECHNICAL FIELD

The present invention belongs to a technical field of Virtual Packages.

BACKGROUND ART

A Virtual Package is a technique of constructing a virtual package by dynamically combining a digital stream recorded on a read-only recording medium such as a BD-ROM and a digital stream recorded on a rewritable recording medium such as a hard disk, in order to develop the contents of the read-only recording medium. Suppose the digital stream recorded on the BD-ROM constitutes a movie work and the digital stream recorded on the hard disk constitutes a sequel to the movie work. This being the case, by constructing the above Virtual Package, the movie work recorded on the BD-ROM and the sequel recorded on the hard disk can be treated as one long feature film and submitted for playback.

For example, the following patent document describes a conventional technique about Virtual Packages.

Patent Document 1: Japanese Patent Application Publication No. 2002-369154

DISCLOSURE OF THE INVENTION

Problems the Invention is Going to Solve

However, when playing back the digital stream recorded on the BD-ROM and the digital stream recorded on the hard disk as one stream sequence, there may be a case where an unstable digital stream is contained in the stream sequence. The unstable digital stream referred to here is such a digital stream that has not yet been downloaded to the hard disk or that is incompletely written to the hard disk. When playing back the stream sequence despite the existence of such an unstable digital stream, the playback may become unstable or halt once a point of playback by playback means has reached the unstable digital stream.

If playback means (such as a decoder) in a playback apparatus is capable of checking whether a stream to be played back is unstable or not, the above playback instability or halt can be avoided. However, the playback means needs to perform an operation of outputting a video signal in a unit of a frame period of 1/24 second or 1/29.94 second, and so is unlikely to have an enough capacity left to conduct such check. Accordingly, the above playback instability and halt are inevitable. In a consumer product industry for manufacturing BD-ROM playback apparatuses, however, a strict quality standard is required for video playback. Therefore, even if the playback means does not have a capacity to check digital streams, the above playback instability and halt cannot be tolerated.

The present invention aims to provide a playback apparatus that can prevent playback instability and halt when playing back a digital stream recorded on a BD-ROM and a digital stream recorded on a hard disk as one stream sequence, even if playback means does not have an available capacity to check an unstable digital stream.

Means of Solving the Problems

The stated aim can be achieved by an integrated circuit for use in a playback device that plays a stream sequence composed of digital streams that are stored on separate recording media, the integrated circuit including: a storage that stores a module, the module having a function of a virtual machine for executing an application recorded on a recording medium; a central processing unit that executes the module to cause the virtual machine to function; and a decoder that is different from the central processing unit and that decodes a video stream and an audio stream that are included in the digital streams stored on the recording media, wherein when the central processing unit executes the module, a package manager manages status information of the digital streams, the status information indicating whether each of the digital streams is in one of an enable status that is recognizable by the playback device and a disable status that is unrecognizable by the playback device, if at least one of the digital streams is in the enable status, the decoder decodes the at least one of the digital streams, and while the decoder decodes one of the at least one of the digital streams that is in the enable status, the package manager changes the status information of a remaining digital stream that is one of the digital streams other than the one of the at least one of the digital streams to one of the enable status and the disable status according to a request from the application.

Effects of the Invention

According to this construction, each digital stream is switched between the enable status and the disable status according to the application, thereby determining whether the digital stream is to be played by the playback device. The application determines whether each digital stream is to be played back by the playback device. Accordingly, in the case where it cannot be confirmed that a digital stream has reliably been written to one of the recording media, the application sets the digital stream to the disable status, so that the digital stream is treated as nonexistent. As a result, the playback device will not erroneously play back an unstable digital stream. Hence unstable or intermittent video playback can be prevented.

Here, the decoder may include a video decoder that decodes the video stream included in the digital stream and an audio decoder that decodes the audio stream included in the digital stream.

Here, the recording media may include a read-only recording medium and a rewritable recording medium, wherein the playback device recognizes a file layout of the read-only recording medium and does not recognize a file layout of the rewritable recording medium, the rewritable recording medium records a digital stream in a state that is contained in a file, the change to the enable status by the package manager is performed by generating virtual volume management information from file management information stored on the read-only recording medium and file management information stored on the rewritable recording medium, and by providing the generated virtual volume management information to the playback device, and the change to the disable status by the package manager is performed by removing the file management information stored on the rewritable recording medium from the virtual volume management information.

Here, the change to the enable status by the package manager may include a process of changing an attribute of the file on the rewritable recording medium to a read-only attribute, and the change to the disable status by the package manager may include a process of changing the attribute of the file on the rewritable recording medium to a rewritable attribute.

Control is exercised according to the application so that, during playback of one digital stream, a remaining digital stream is downloaded to the recording medium. Once the playback of the digital stream has completed, the downloaded digital stream is set to the enable status, to allow the playback unit to play back the written digital stream.

If the writing of the remaining digital stream has not completed during the playback of the digital stream, the remaining digital stream remains in the disable status, to keep the digital stream from being played back by the playback unit. Since the playability of a digital stream is set in accordance with the progress of download, the playback of a digital stream in the stream sequence and the download of a digital stream in the stream sequence can be executed in parallel. Suppose a digital stream recorded on a BD-ROM constitutes a movie work and a digital stream downloaded on a hard disk constitutes a trailer. This being the case, it is possible to download the trailer digital stream while playing back the movie work digital stream and, as soon as the playback of the movie work digital stream ends, start playing back the trailer digital stream.

BRIEF DESCRIPTION OF THE DRAWINGS

FIG. 20A shows what kinds of PlayList playback time axis are defined by PL information stored in the Local Storage.

FIG. 20B shows a concept of Progressive PlayList information.

FIG. 21 shows generation of an instance by a management information conversion module 39.

FIG. 22 shows a call of a Play method in a PlayList object.

FIG. 27A is a flowchart of processing when calling an enableClip method.

FIG. 27B is a flowchart of processing when calling a disableClip method.

BEST MODE FOR CARRYING OUT THE INVENTION (First Embodiment)

Figure 1:
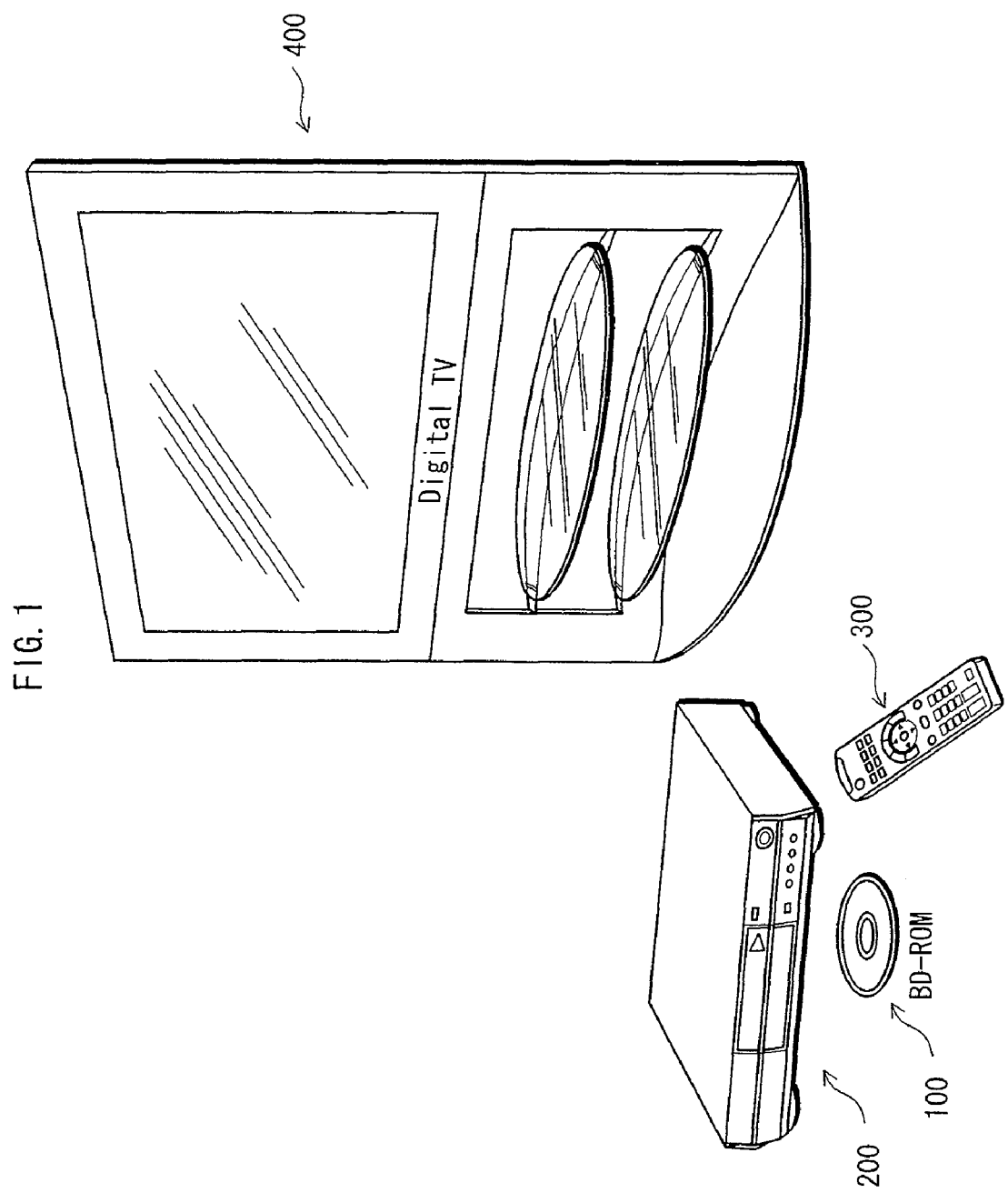
FIG. 1 shows an example of use of a playback apparatus according to the present invention.

The following describes an embodiment of a recording medium according to the present invention. Firstly, a form of use out of the forms of an act of working of a playback apparatus according to the present invention is described below. FIG. 1 shows an exemplary form of use of the playback apparatus according to the present invention. In FIG. 1, the playback apparatus according to the present invention is a playback apparatus 200. The playback apparatus 200 is submitted for use in supplying movie works in a home theatre system that includes a remote control 300 and a television 400.

Figure 2:
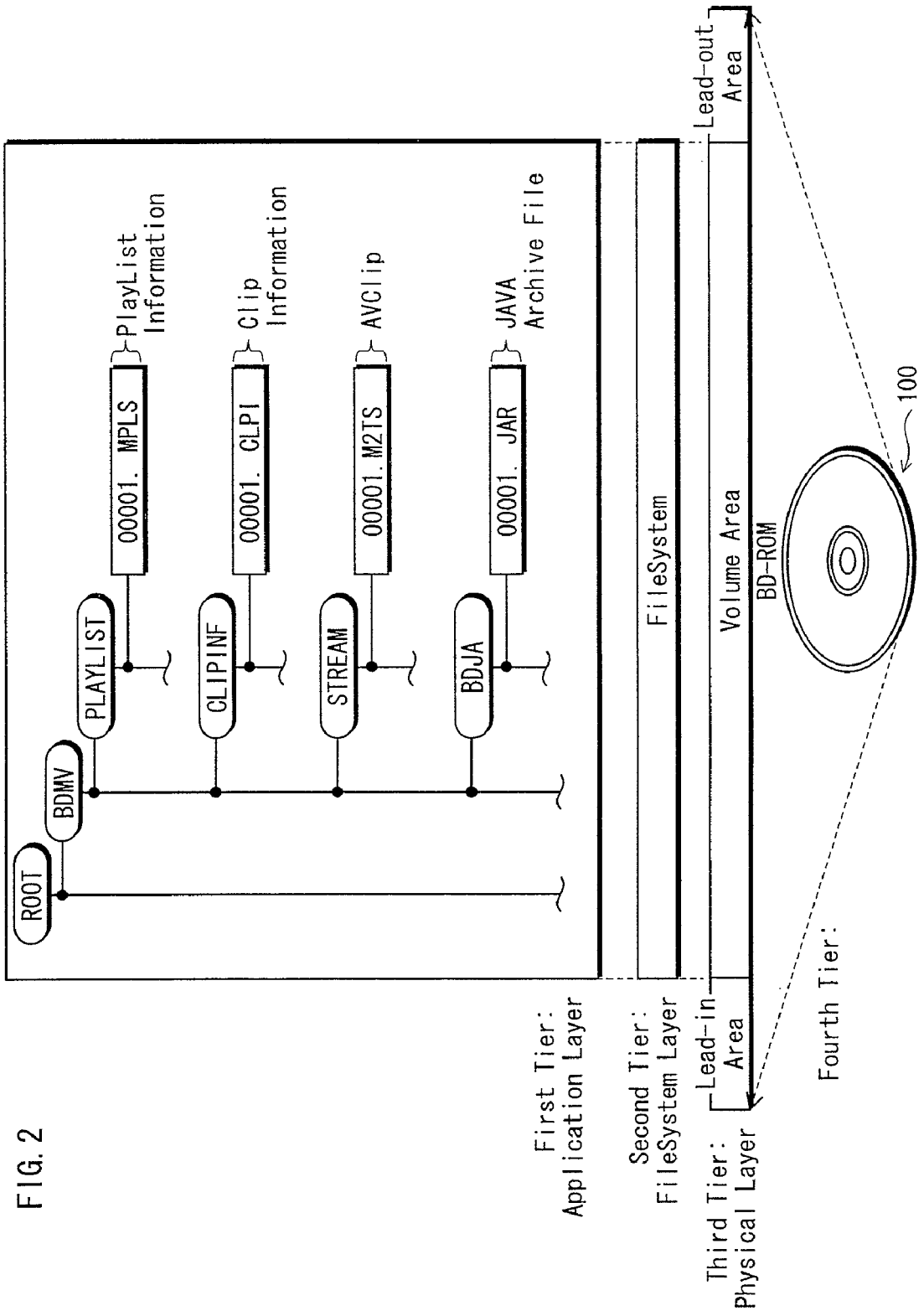
FIG. 2 shows an internal structure of a BD-ROM.

An exemplary form of use of the playback apparatus according to the present invention is as described above. A recording medium targeted for playback by the playback apparatus according to the present invention is described next. The recording medium played by the playback apparatus according to the present invention is a BD-ROM. FIG. 2 shows an internal structure of the BD-ROM.

The BD-ROM is shown at the fourth tier in the drawing, while a track on the BD-ROM is shown at the third tier. The track depicted here results from a track spiraling from an inner circumference to an outer circumference of the BD-ROM having been drawn out to the sides. This track is made up of a lead-in area, a volume area, and a lead-out area. The volume area in FIG. 2 has a layered structure made up of a physical layer, a filesystem layer, and an application layer. Expressing a format of the application layer (application format) of the BD-ROM using a directory structure gives the first tier in FIG. 2. A BDMV directory is placed under a ROOT directory in the BD-ROM, as shown at the first tier.

Under the BDMV directory exist four subdirectories known as a PLAYLIST directory, a CLIPINF directory, a STREAM directory, and a BDJA directory.

The STREAM directory stores a file forming a main part of a digital stream, with an extension "M2TS" being assigned to this file (00001.M2TS).

The PLAYLIST directory stores a file (00001.MPLS) with an extension "MPLS".

The CLIPINF directory stores a file (00001.CLPI) with an extension "CLPI". These files are described next.

<AVClip>

Figure 3:
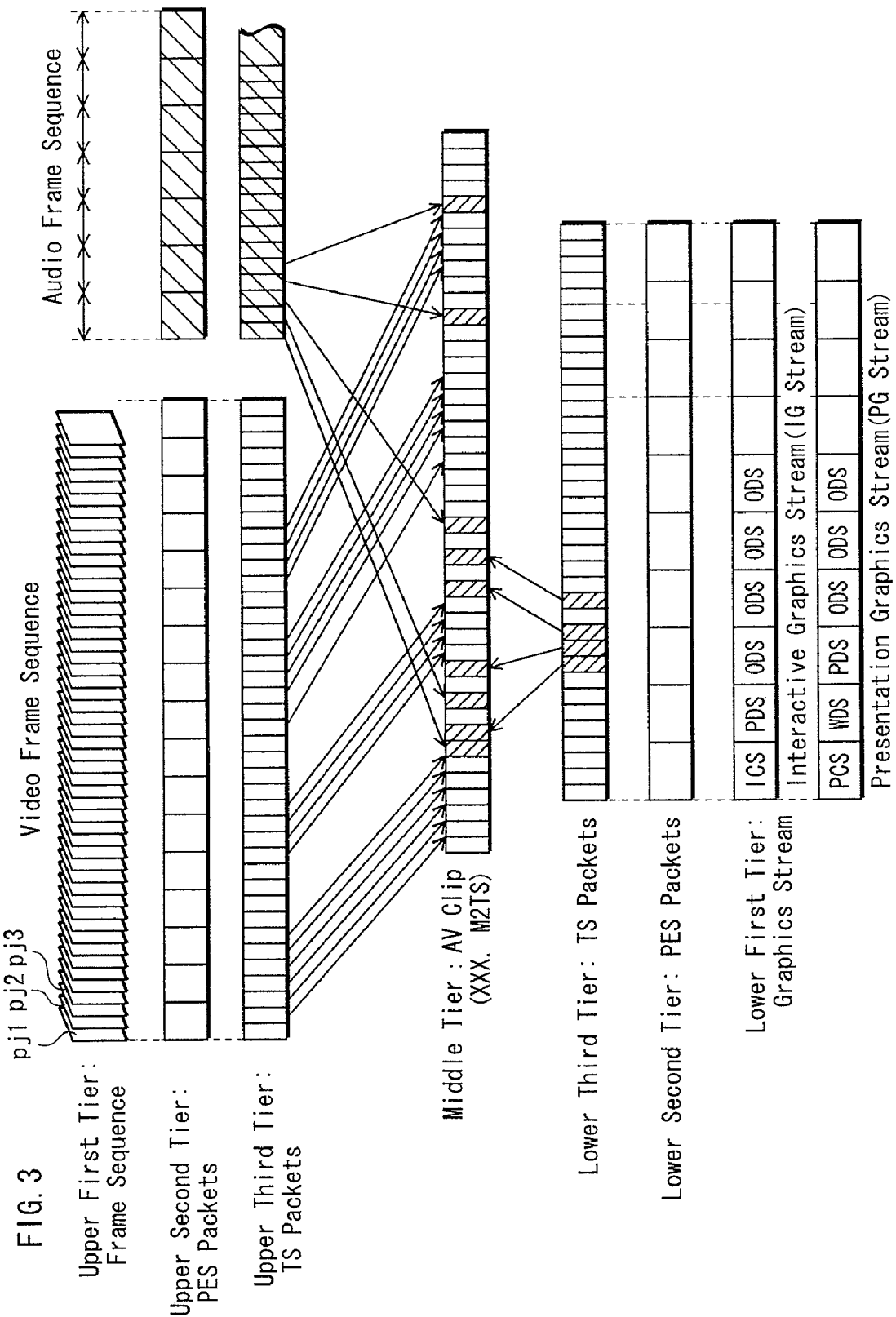
FIG. 3 schematically shows a structure of an AVClip.

The file with the extension "M2TS" is described firstly. FIG. 3 schematically shows how the file with the extension "M2TS" is structured. The file with the extension "M2TS" (00001.M2TS, 00002.M2TS, 00003.M2TS, . . . ) stores an AVClip. The AVClip (middle tier) is constituted by multiplexing TS packets resulting from the conversion of a video stream composed of a plurality of video frames (pictures pj1, pj2, pj3) and an audio stream composed of a plurality of audio frames (upper first tier) firstly to PES packets (upper second tier) and then to TS packets (upper third tier) and the conversion of a subtitle Presentation Graphics stream (PG stream at the lower first tier) and an Interactive Graphics stream (IG stream at the lower first tier) to TS packets (lower third tier) in the same manner.

Apart from the AVClip obtained through multiplexing as shown in FIG. 3, there also exist AVClips that do not result from multiplexing. Such AVClips are called SubClips, and include AVClips constituting an audio stream, a graphics stream, a text subtitle stream (TextSTStream), and the like.

<Clip Information>

The file with the extension "CLPI" (00001.CLPI) is a piece of Clip information corresponding to an AVClip. Clip information, being management information, contains an EP_map showing a head location of a GOP and information such as an encoding format, a frame rate, a bit rate, and a resolution of streams in the AVClip.

<PlayList Information>

Figure 4:
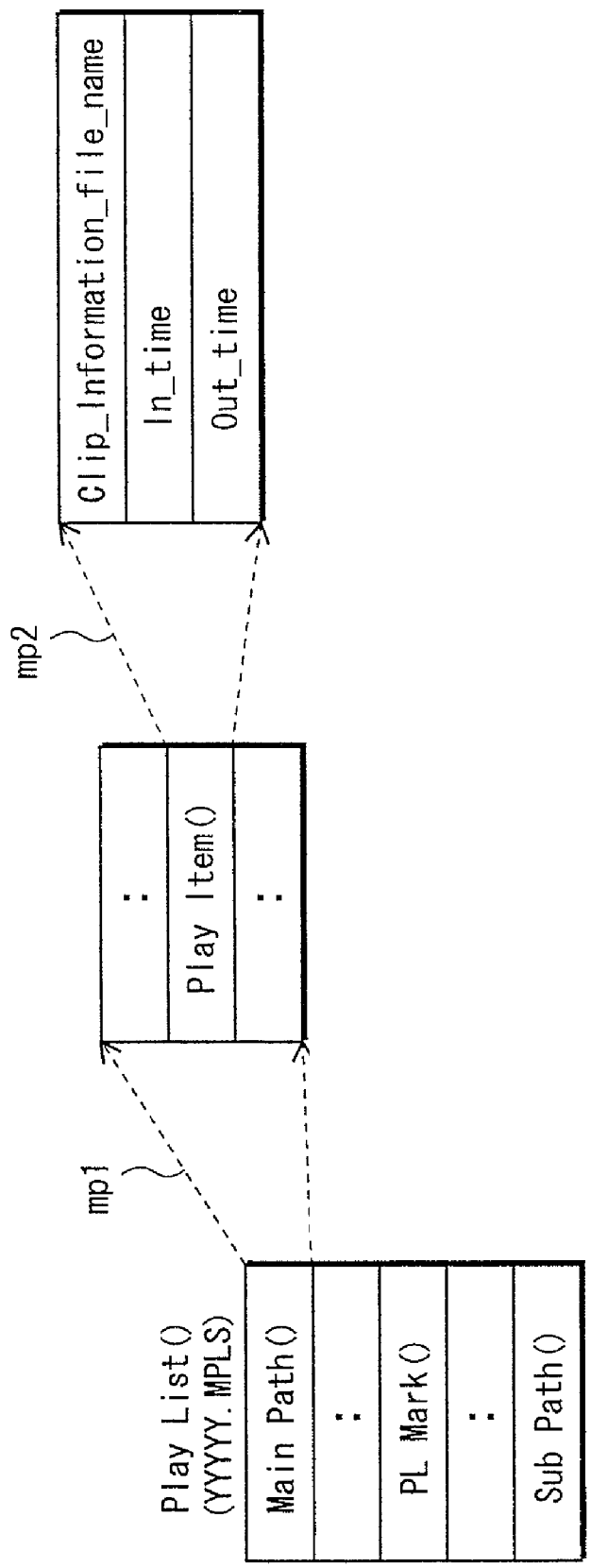
FIG. 4 shows a structure of PL information.

The file with the extension "MPLS" (0000.MPLS) stores PlayList (PL) information. The PL information defines a playlist by referring to AVClips. FIG. 4 shows a structure of the PL information. As shown on the left side of the drawing, the PL information includes MainPath information, PLMark information, and SubPath information.

Figure 5:
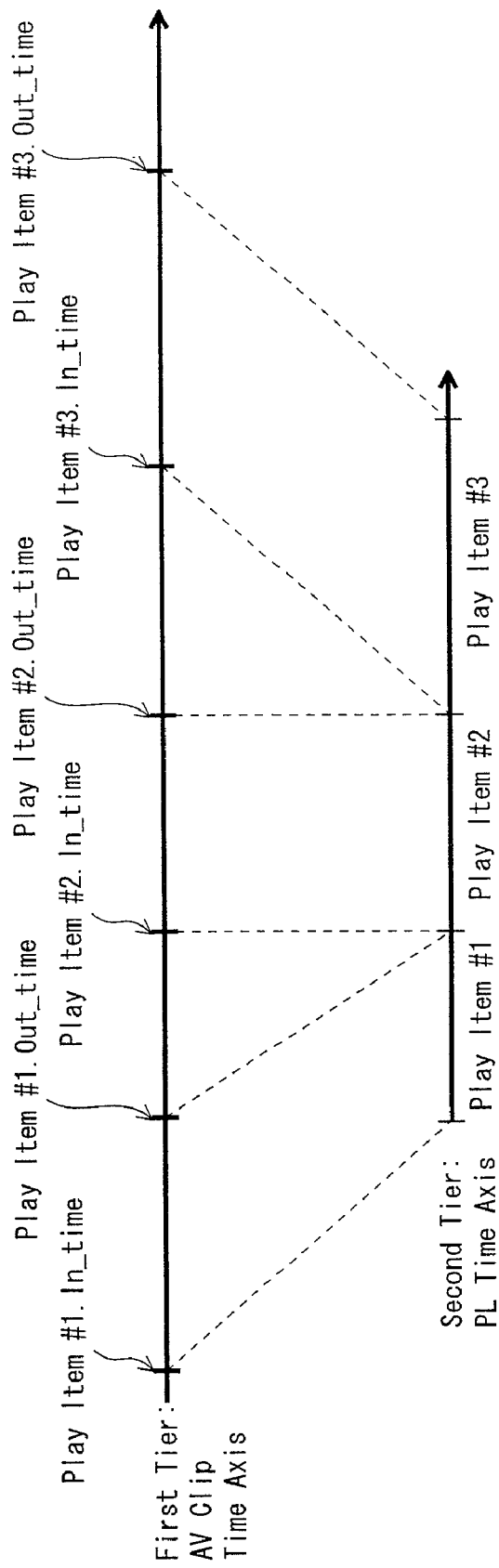
FIG. 5 shows a relationship between an AVClip time axis and a PL time axis.

The MainPath information (MainPath( )) is composed of a plurality of pieces of PlayItem information (PlayItem( )), as indicated by the arrows mp1. A PlayItem is a playback section defined by specifying an In_Time and an Out_Time on one or more AVClip time axes. A playlist (PL) composed of a plurality of playback sections is defined by placing a plurality of pieces of PlayItem information. The arrows mp2 in FIG. 4 show a close up of an internal structure of PlayItem information. As shown in the drawing, the PlayItem information is composed of an In_time, an Out_time, and a Clip_information_file_name showing a corresponding AVClip. FIG. 5 shows a relationship between an AVClip and a PL. The first tier shows a time axis of the AVClip, while the second tier shows a time axis of the PL. The PL information includes three pieces of PlayItem information PlayItems#1, #2, and #3, with three playback sections being defined by the In_times and Out_times of PlayItems#1, #2, and #3. A different time axis from the AVClip is defined when these playback sections are arranged in line. This is the PL time axis shown at the second tier. Defining a different time axis from the AVClip is thus enabled by the definitions in the PlayItem information.

Figure 6:
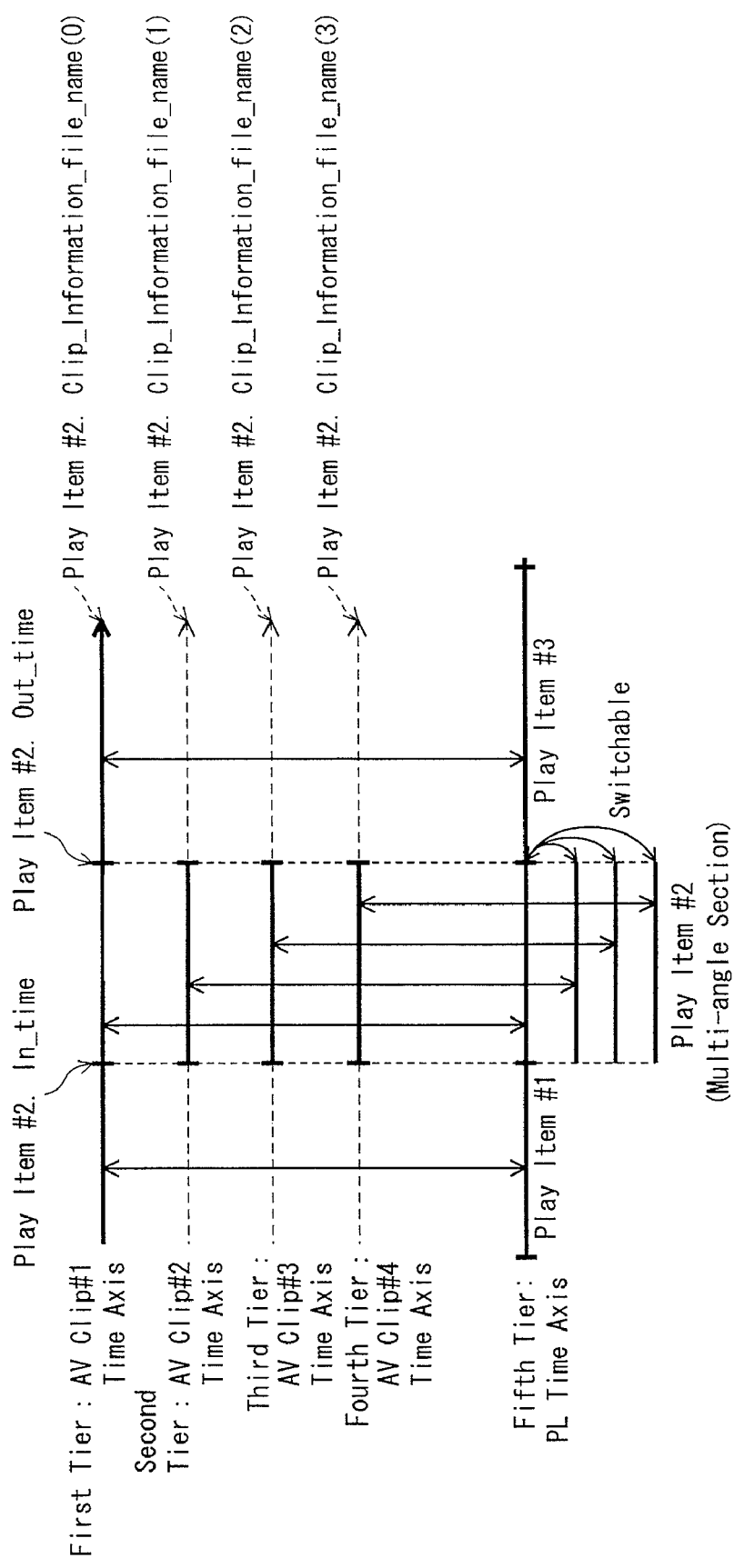
FIG. 6 shows batch specification using four Clip_Information_file_names.

As a rule, one AVClip is specified at any one time, though batch specification of a plurality of AVClips is also possible. Batch specification of AVClips is performed using a plurality of Clip_Information_file_names in PlayItem information. FIG. 6 shows the batch specification of AVClips using four Clip_Information_file_names. The first to fourth tiers in the drawing show four AVClip time axes (time axes of AVClips#1, #2, #3, and #4), while the fifth tier shows a PL time axis. The four time axes are specified with four Clip_Information_file_names included in the PlayItem information. This allows four alternatively playable playback sections to be defined by an In_time and Out_time of the PlayItem. As a result, a section composed of a plurality of pieces of switchable angle video (so-called multi-angle section) is defined on the PL time axis.

Figure 7:
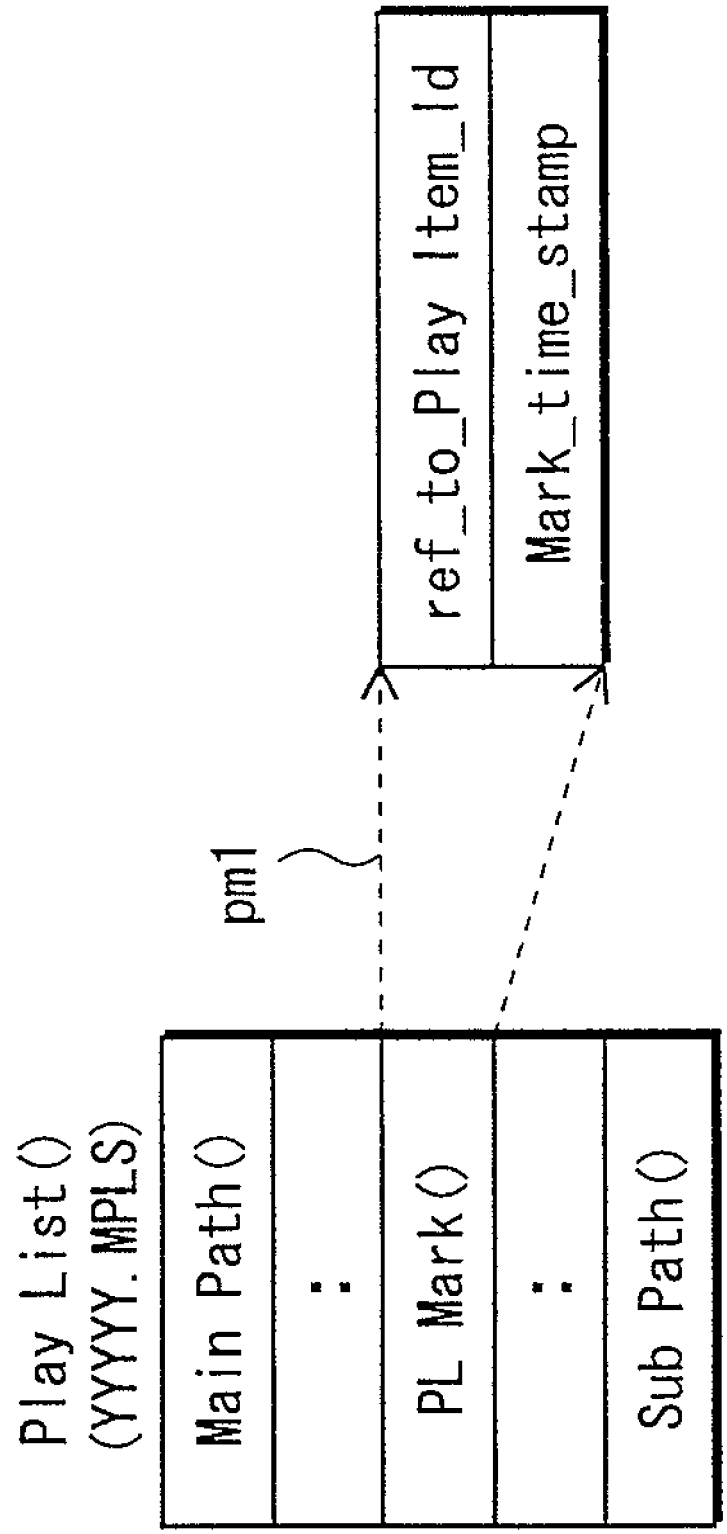
FIG. 7 shows an internal structure of PLmark information.
Figure 8:
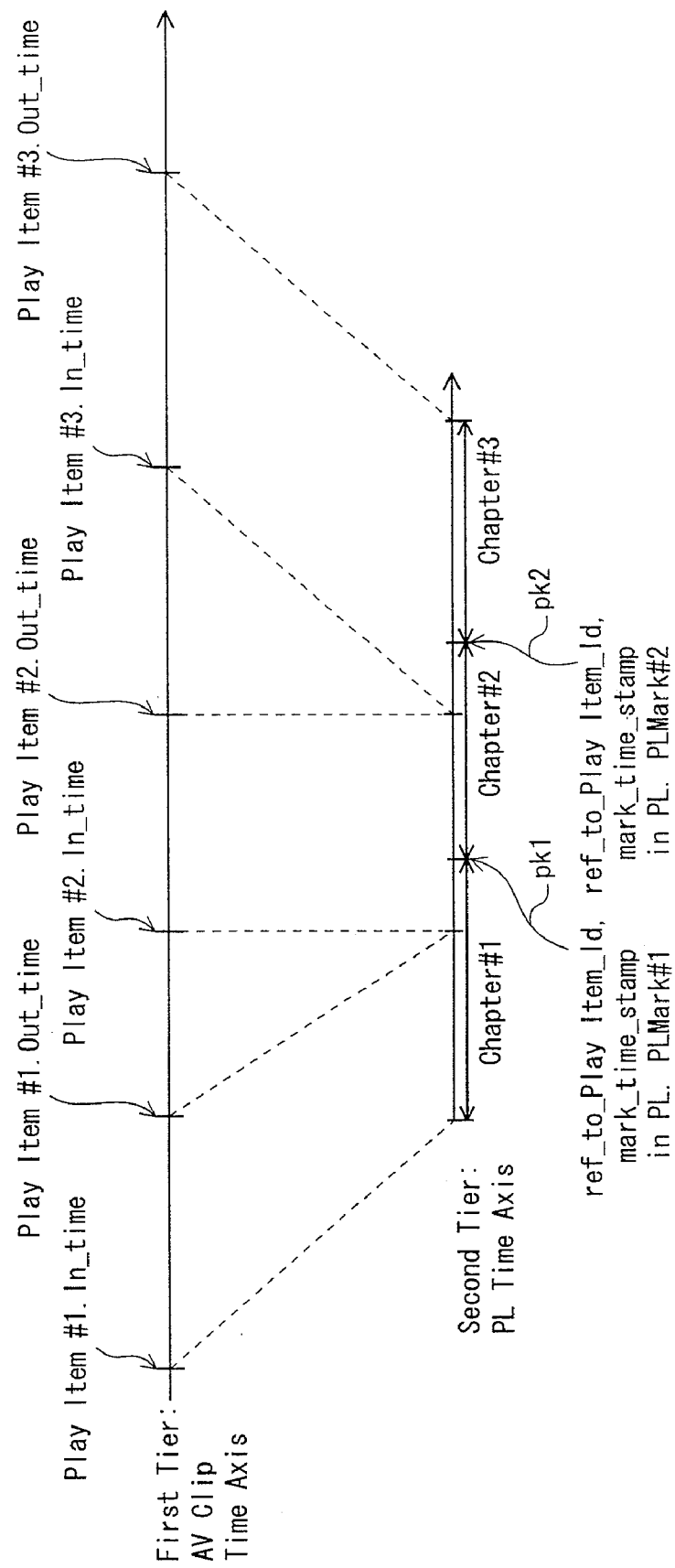
FIG. 8 shows chapter definitions using PLmarks.

The PLMark information (PLmark( )) specifies an arbitrary section on a PL time axis as a chapter. FIG. 7 shows an internal structure of the PLMark information, which includes a ref_to_PlayItem_Id and a Mark_time_stamp, as indicated by the arrows pm1. FIG. 8 shows the definition of chapters using PLmarks. The first tier in the drawing shows the AVClip time axis, while the second tier shows the PL time axis. The arrows pk1 and pk2 in FIG. 8 show the specification of a PlayItem (ref_to_PlayItem_Id) and a point in time (mark_time_stamp) in PLMarks. Three chapters (Chapters#1, #2, and #3) are defined on the PL time axis as a result of these specifications. This completes the description of PLmarks. The SubPath information is described next.

Figure 9:
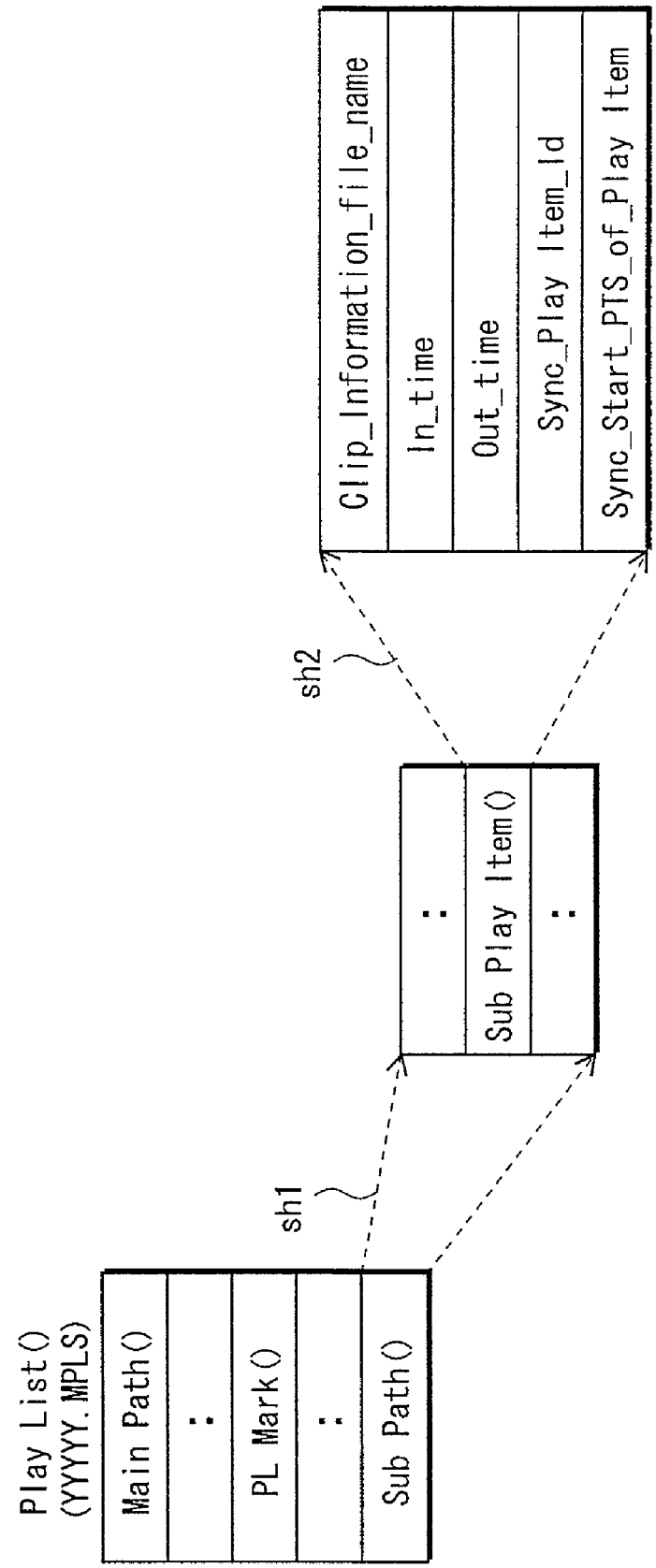
FIG. 9 shows an internal structure of SubPath information.

The SubPath information (SubPath( )) defines one or more playback sections by specifying an In_Time and an Out_Time on a SubClip time axis, and has an internal structure shown in FIG. 9. As illustrated, the SubPath information is composed of a plurality of pieces of SubPlayItem information (SubPlayItem( )) as indicated by the arrows sh1. In a close up marked by the arrows sh2, SubPlayItem information is composed of a Clip_information_file_name, an In_time, an Out_time, a Sync_PlayItem_Id, and a Sync_start_Pts_of PlayItem. An In_Time and an Out_Time on the SubClip time axis are specified using the Clip_information_file_name, the In_time, and the Out_time included in the SubPlayItem information. The Sync_PlayItem_Id and the Sync_start_Pts_of PlayItem specify synchronization of a playback section on the SubClip time axis with the PL time axis. This allows processing on both the SubClip time axis and the PL time axis to proceed in sync with one another.

Figure 10:
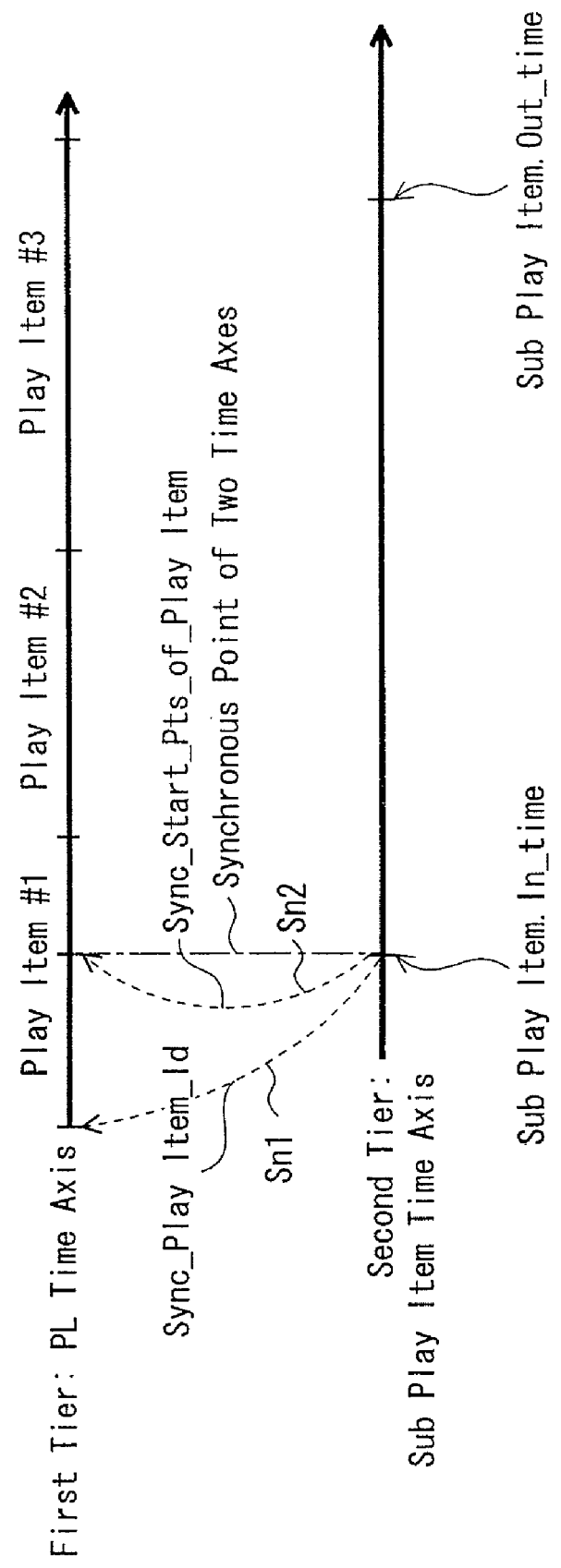
FIG. 10 shows sync specification and playback section definitions on a SubPlayItem time axis.

FIG. 10 shows the sync specification and the definition of a playback section on the SubClip time axis. The first tier in the drawing shows the PL time axis, while the second tier shows the SubClip time axis. A SubPlayItem.IN_time and a SubPlayItem.Out_time in the drawing respectively show the start and end of a playback section. Thus, it is apparent that a playback section is also defined on the SubClip time axis. A Sync_PlayItem_Id marked by the arrow Sn1 shows the sync specification of a PlayItem, while a sync_start_PTS_of_PlayItem marked by the arrow Sn2 specifies a point during the PlayItem on the PL time axis.

A feature of PL information in BD-ROMS is that it makes possible the definition of multi-angle sections that enable AVClips to be switched and sync sections that enable AVClips and SubClips to be synchronized. Clip information and PL information described above are classified as "static scenarios".

The following describes "dynamic scenarios". Here, "dynamic" refers to the fact that the contents of playback controls changes due to user key events and status changes in the playback apparatus 200. With BD-ROMs, playback controls can be described using a same description as Java™ applications. That is, with BD-ROMs, Java™ applications act as dynamic scenarios.

<Java™ Applications>

The following describes Java™ applications. A Java™ application is composed of one or more xlet programs loaded in a heap area (also called a work memory) of a virtual machine. An application is constituted from the xlet programs loaded in the work memory, as well as data. The structure of the Java™ application is as described above.

An actual Java™ application is a Java™ archive file (00001.jar, 00002.jar) stored in the BDJA directory under the BDMV directory shown in FIG. 2. Java™ archive files are described below with reference to FIG. 11.

<Java™ Archive File>

Figure 11A:
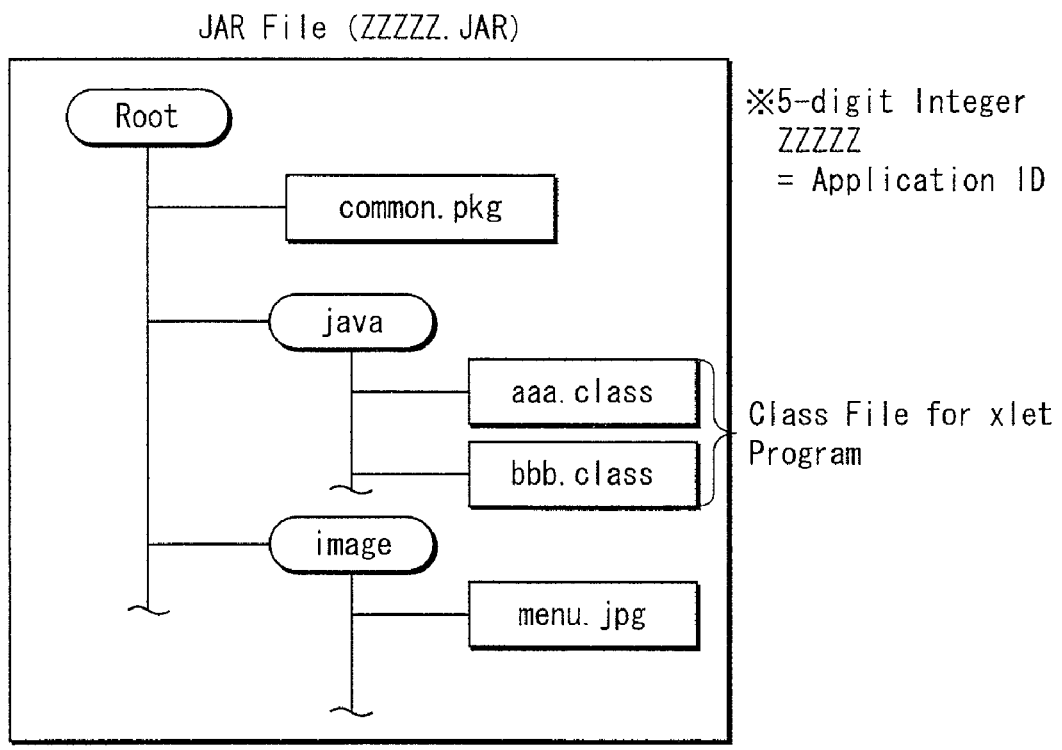
FIG. 11A shows programs and data housed in a Java™ archive file.

The Java™ archive file (00001.JAR in FIG. 2) is a collection of one or more class files and data files etc. FIG. 11A shows programs and data collected in the archive file. The data in FIG. 11A is a plurality of files collected by a Java™ archiver and arranged into a directory structure shown within the frame. This directory structure includes a Root directory, a Java™ directory, and an image directory, with a common-.pkg file, class files (aaa.class, bbb.class), and a menu.jpg file being placed within the respective directories. The Java™ archive file is a result of the Java™ archiver having collected these files together. The class files and data are expanded when read from the BD-ROM to a cache, and treated in the cache as a plurality of files existing in directories. The five-digit numerical value "zzzzz" in the filename of the Java™ archive file shows an ID of the application (application ID). By referring to this numerical value in the filename when the Java™ archive file has been read to the cache, it is possible to extract data as well as programs constituting an arbitrary Java™ application.

The class files (aaa.class, bbb.class) in FIG. 11A correspond to the above xlet programs. Playback procedures in an operating mode (BD-J) supported by a Java™ system requirement are defined using xlet programs which are instances of these class files. An xlet program is a Java™ program capable of using a JMF (Java™ Media FrameWork) interface, and performs processing based on key events in accordance with JMF etc. The xlet program is capable of JMF processing, and so can instruct the playback apparatus 200 to play back a PlayList by generating a JMF instance (PlayList Object) corresponding to an MPLS file. Also, the xlet program can execute processes that are unique to the BD-ROM playback apparatus 200 by writing calls for API functions.

Furthermore, the xlet program can execute procedures for accessing websites and downloading content. This enables playback of original works created by mixing downloaded content with playlists.

Figure 11B:
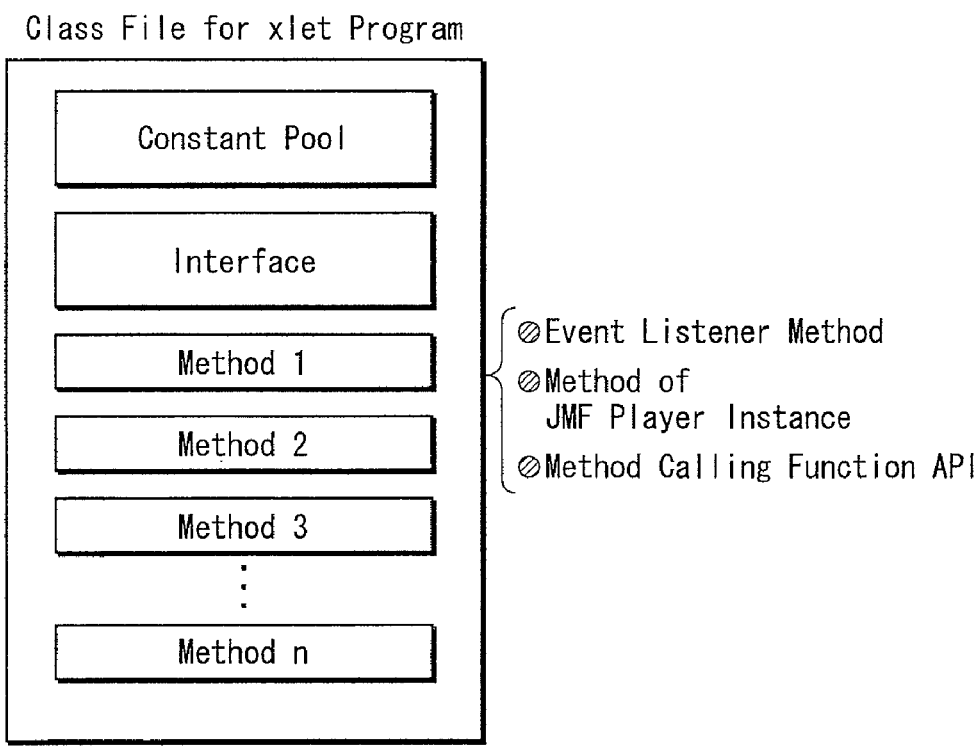
FIG. 11B shows an internal structure of a class file.

The class file of the xlet program is described next. FIG. 11B shows an internal structure of the class file. As shown in FIG. 11B, this class file, similar to a normal class file, is composed of a constant pool, an interface, and methods 1, 2, 3, . . . , n. The methods in the class file include methods (EventListeners) that are triggered by preregistered key events and methods for calling API functions in the BD-ROM playback apparatus 200. Computation procedures and the like in these methods are described by employing local variables allocated to a given method and arguments when the method is called. The Java™ archive file is as described above. This completes the description of the BD-ROM. The following describes an internal structure of the playback apparatus according to the present invention.

<Playback Apparatus>

Figure 12:
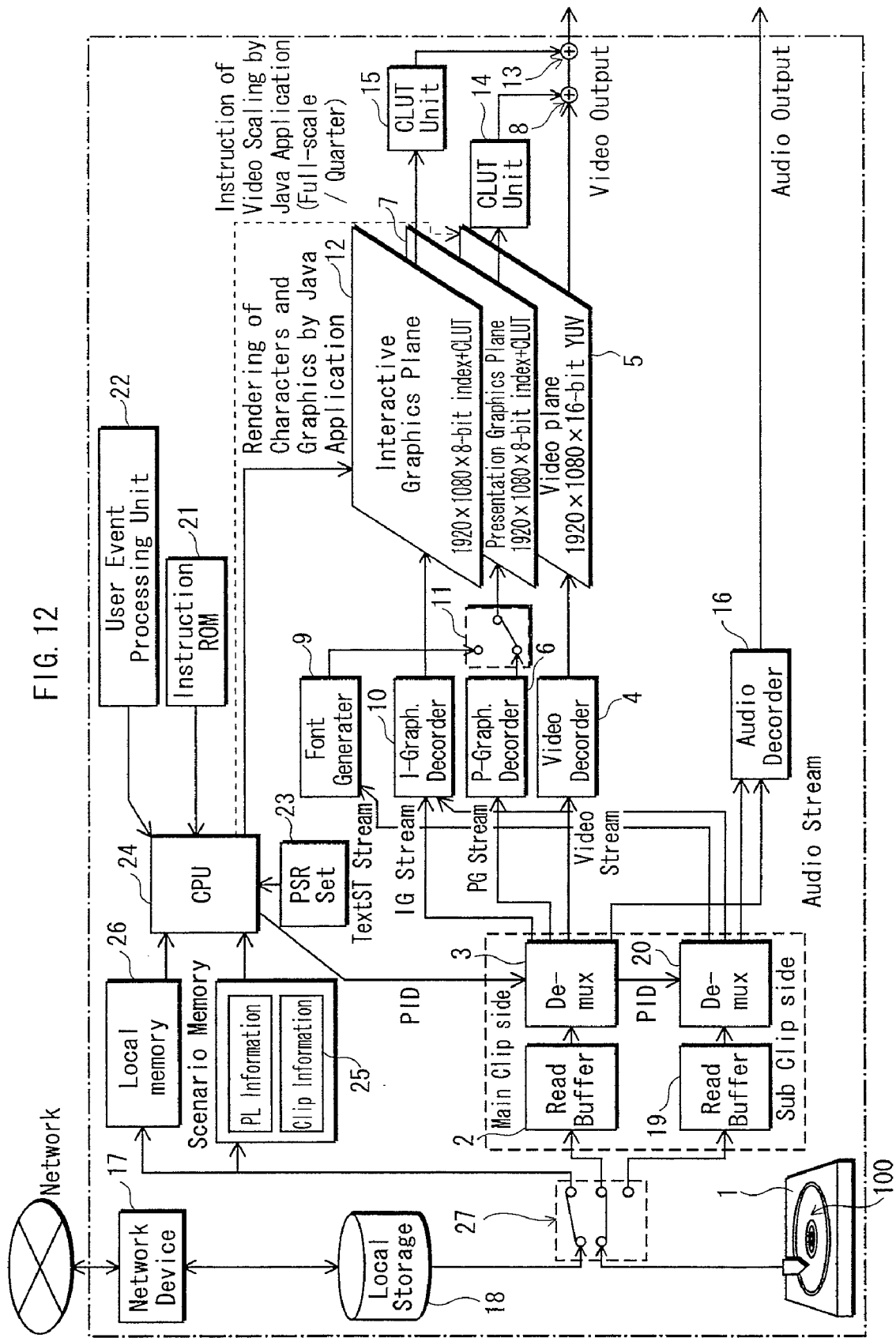
FIG. 12 shows an internal structure of the playback apparatus according to the present invention.

FIG. 12 shows the internal structure of the playback apparatus according to the present invention. The playback apparatus according to the present invention is manufactured based on this internal structure. The playback apparatus according to the present invention is roughly made up of two parts that are a system LSI and a drive device. The playback apparatus according to the present invention can be manufactured by mounting these parts on a cabinet and substrate of the apparatus. The system LSI is an integrated circuit including various processing units for achieving the functions of the playback apparatus. The playback apparatus manufactured in this way includes a BD-ROM drive 1, a Read Buffer 2, a demultiplexer 3, a Video Decoder 4, a Video Plane 5, a P-Graphics Decoder 6, a Presentation Graphics Plane 7, a composition unit 8, a Font Generator 9, an I-Graphics Decoder 10, a switch 11, an Interactive Graphics Plane 12, a composition unit 13, a CLUT unit 14, a CLUT unit 15, an Audio Decoder 16, a Network Device 17, a Local Storage 18, a Read Buffer 19, a demultiplexer 20, an instruction ROM 21, a user event processing unit 22, a PSR set 23, a CPU 24, a scenario memory 25, a Local Memory 26, and a switch 27.

Elements pertaining to playback of AVClips recorded on the BD-ROM (the BD drive 1—the Audio Decoder 16) are described firstly.

The BD-ROM drive 1 loads/ejects the BD-ROM, and accesses the BD-ROM.

The Read Buffer 2 is a FIFO memory in which TS packets read from the BD-ROM are stored on a first-in first-out basis.

The demultiplexer (De-MUX) 3 reads TS packets from the Read Buffer 2 and converts these TS packets to PES packets. PES packets having PIDs set by the CPU 24 are then output to any of the Video Decoder 4, the P-Graphics Decoder 6, the I-Graphics Decoder 10, and the Audio Decoder 16.

The Video Decoder 4 decodes a plurality of PES packets output from the demultiplexer 3 to obtain pictures in uncompressed format, and writes these pictures to the Video Plane 5.

The Video Plane 5 is for storing uncompressed pictures. A plane is a memory area in the playback apparatus for storing one screen worth of pixel data. The Video Plane 5 has a 1920×1080 resolution, with stored picture data being constituted from pixel data expressed by 16-bit YUV. In the Video Plane 5, playback video in a video stream can be scaled per frame. Scaling involves changing playback video per frame to either ¼ (quarter) or ¹⁄₁ (full-scale) of the entire Video Plane 5. Such scaling is executed in a BD-J mode in accordance with an instruction from the CPU 24, enabling screen production whereby a playback image of a video stream is relegated to a corner of the screen or projected over the whole screen.

The P-Graphics Decoder 6 decodes a Presentation graphic stream read from the BD-ROM and writes uncompressed graphics to the Presentation Graphics Plane 7. Subtitles appear on the screen as a result of the graphics stream being decoded.

The Presentation Graphics Plane 7, being a memory with room for one screen worth of data, is able to store one screen worth of uncompressed graphics. This plane has a 1920×1080 resolution, with each pixel of the uncompressed graphics on the Presentation Graphics Plane 7 being expressed by an 8-bit index color. The uncompressed graphics stored on the Presentation Graphics Plane 7 are submitted for display by converting such index colors using a CLUT (Color Lookup Table).

The composition unit 8 composites uncompressed picture data (i) stored on the Video Plane 5 with the storage contents of the Presentation Graphics Plane 7.

The Font Generator 9 uses a character font to expand text code included in a textST stream in a bitmap, and writes the expanded code to the Presentation Graphics Plane 7.

The I-Graphics Decoder 10 decodes an IG stream read from the BD-ROM or the Local Storage 18 in an HDMV mode, and writes uncompressed graphics to the Interactive Graphics Plane 12.

The switch 11 selectively writes one of a font sequence generated by the Font Generator 9 and graphics resulting from the decoding by the P-Graphics Decoder 6, to the Presentation Graphics Plane 7.

The Interactive Graphics Plane 12 is written with uncompressed graphics resulting from the decoding by the I-Graphics Decoder 10. Characters and graphics drawn by an application are written onto the Interactive Graphics Plane 12 in the BD-J mode.

The composition unit 13 composites the storage contents of the Interactive Graphics Plane 12 with a composite image output from the composition unit 8 (i.e. composition of uncompressed picture data and storage contents of the Presentation Graphics Plane 7). This compositing enables characters and graphics written to the I-Graphics Decoder 10 by an application to be overlaid on uncompressed picture data and displayed.

The CLUT unit 14 converts index colors in the uncompressed graphics stored on the Video Plane 5 to Y/Cr/Cb.

The CLUT unit 15 converts index colors in the uncompressed graphics stored on the Interactive Graphics Plane 12 to Y/Cr/Cb.

The Audio Decoder 16 decodes PES packets output from the demultiplexer 3 and outputs uncompressed audio data.

The elements pertaining to AVClip playback are as described above. The following describes elements pertaining to operations in the BD-J mode (the Network Device 17—the De-mux 20).

The Network Device 17 realizes a communication function in the playback apparatus. In the case of a Java™ application specifying an URL in the BD-J mode, the Network Device 17 establishes a TCP or FTP connection etc. with a website indicated by the URL. The Java™ application is made to download from the website as a result of such a connection being established.

The Local Storage 18 is a hard disk for storing content supplied from communication media and recording media other than the BD-ROM, such as content downloaded from a website via a connection established by the Network Device 17, together with metadata. The metadata is information for binding and managing downloaded content in the Local Storage 18. By accessing the Local Storage 18, an application in the BD-J mode can perform a variety of processes using the downloaded content.

The Read Buffer 19 is a FIFO memory that stores TS packets constituting a SubClip on a first-in first-out basis in the case of such a SubClip being included in the downloaded content stored on the Local Storage 18.

The demultiplexer (De-MUX) 20 reads TS packets from the Read Buffer 19 and converts the read TS packets to PES packets. PES packets having specific PIDs are then output to the Font Generator 9, the I-Graphics Decoder 10, and the Audio Decoder 16.

The above elements from the Network Device 17 to the De-mux 20 enable content downloaded by a Java™ application via a network to be played in a similar manner to content recorded on the BD-ROM. The following describes elements for realizing collective controls in the playback apparatus (the instruction ROM 21—the switch 27).

The instruction ROM 21 stores software that defines controls relating to the playback apparatus.

The user event processing unit 22, in response to a key operation of the remote control or the front panel of the playback apparatus, outputs a user event for performing a corresponding operation to the CPU 24.

The PSR set 23 is a set of registers internal to the playback apparatus, and is composed of 64 Player Status Registers (PSRs) and 4096 General Purpose Registers (GPRs). PSR4 to PSR8 are used to express a current playback point.

PSR4 indicates a title of the current playback point as a result of having been set to a value from 1 to 100. Setting PSR4 to 0 indicates that the current playback point is a top menu.

PSR5 indicates a chapter number of the current playback point as a result of having been set to a value from 1 to 999. Setting PSR5 to 0xFFFF indicates a null chapter number in the playback apparatus.

PSR6 indicates a number of a PL (current PL) to which the current playback point belongs as a result of having been set to a value from 0 to 999.

PSR7 indicates a number of a PlayItem (current PlayItem) to which the current playback point belongs as a result of having been set to a value from 0 to 255.

PSR8 indicates the current playback point (current PTM (Presentation TiMe)) using 45 KHz time accuracy, as a result of having been set to a value from 0 to 0xFFFFFFFF, These PSR4 to PSR8 enable the current playback point to be identified on the time axis shown in FIG. 8.

The CPU 24 runs software stored in the instruction ROM 21 to execute controls relating to the entire playback apparatus. These controls change dynamically depending on user events output from the user event processing unit 22 and each PSR value in the PSR set 23.

The scenario memory 25 is for storing current PL information and current Clip information. The current PL information is a piece of PL information recorded on the BD-ROM that is currently targeted for processing. The current Clip information is a piece of Clip information recorded on the BD-ROM that is currently targeted for processing.

The Local Memory 26 is a cache memory for temporarily storing the recorded contents of the BD-ROM, given a low reading speed from the BD-ROM. The provision of the Local Memory 26 allows an application in the BD-J mode to run efficiently.

The switch 27 selectively delivers data read from the BD-ROM and the Local Storage 18 to one of the Read Buffer 2, the Read Buffer 19, the scenario memory 25, and the Local Memory 26.

The hardware structure of the playback apparatus according to this embodiment is as described above. The following describes a filesystem structure in the playback apparatus according to this embodiment.

Figure 13A:
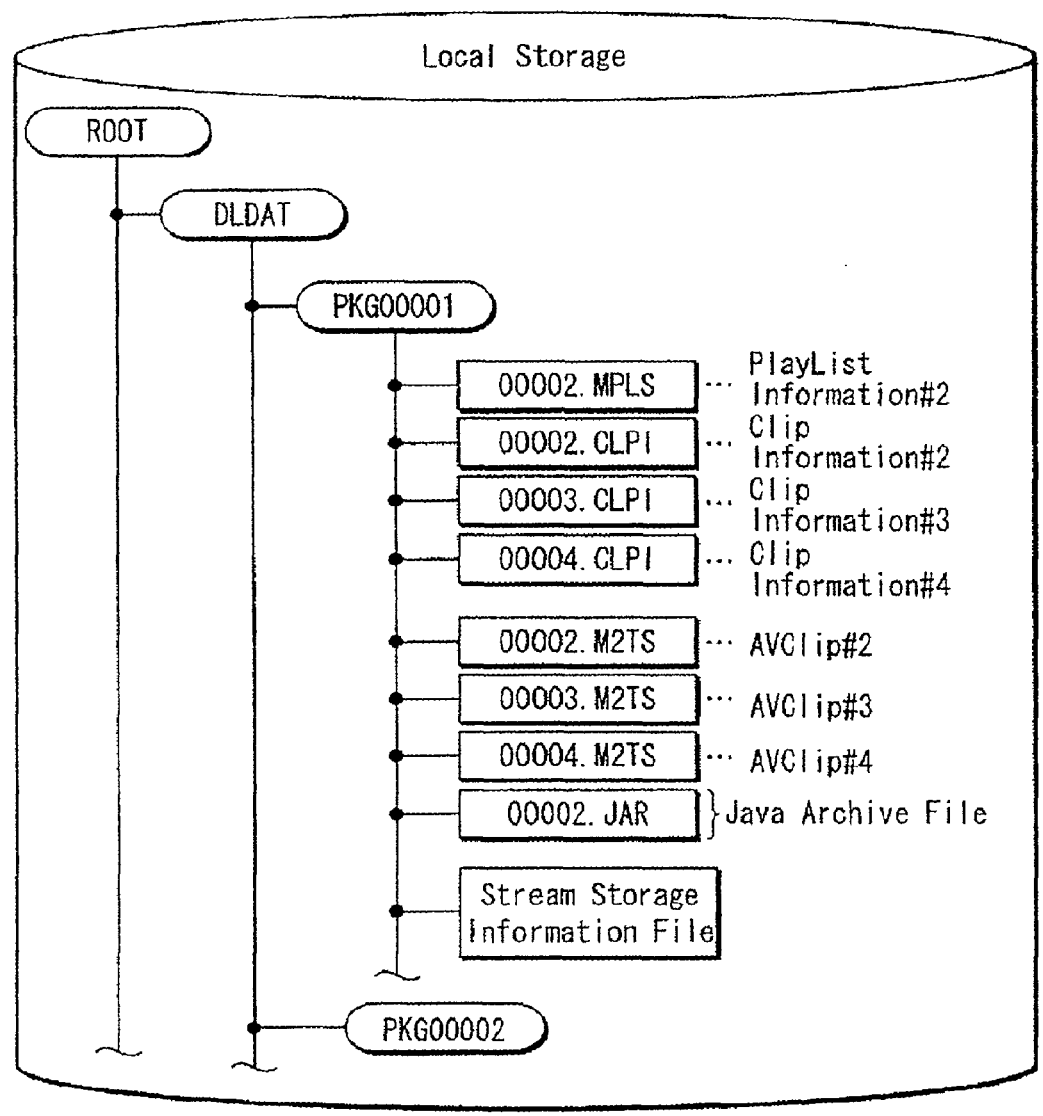
FIG. 13A shows a directory structure in a Local Storage 18.

FIG. 13A shows a directory structure in the Local Storage 18. In this directory structure, a subdirectory "DLDAT" is located under a ROOT directory, and under this are subdirectories "PKG00001" and "PKG00002". "PKG00001" and "PKG00002" are each a volume label of a BD-ROM, and indicate that a directory corresponding to a BD-ROM having a volume label "PKG00001" and a directory corresponding to a BD-ROM having a volume label "PKG0002" are present on the Local Storage 18. The subdirectory "PKG00001" shows a location of downloaded data corresponding to the BD-ROM with the volume label "PKG00001". Providing subdirectories in a directory corresponding to each BD-ROM allows downloaded data relating to each BD-ROM to be stored separately. Under these subdirectories are stored PlayList information, Clip information, and AVClips, similar to what is stored on the BD-ROM. There also additionally exist a Java™ archive file and a stream storage location information file.

It is supposed here that while an AVClip recorded on the BD-ROM corresponds to a movie work, an AVClip recorded on the Local Storage 18 corresponds to a trailer of a movie work currently showing at theaters. Since trailers are changed with time, a trailer of a movie work currently showing at theaters is recorded on the Local Storage 18 as an AVClip.

Figure 13B:
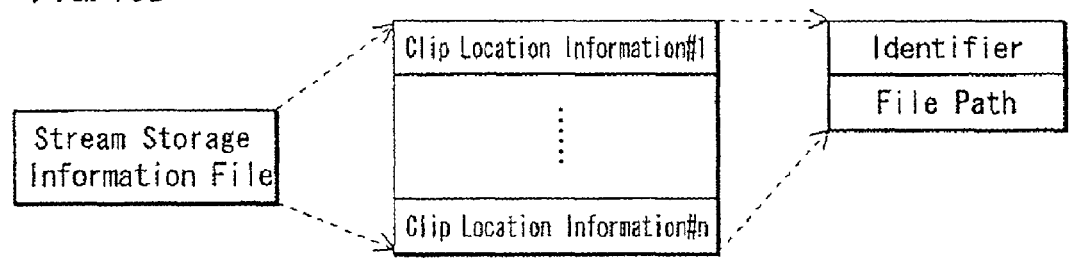
FIG. 13B shows an internal structure of a stream storage location information file.

The stream storage location information file is explained next. The stream storage location information file is information showing a list of files constituting a Virtual Package. FIG. 13B shows an internal structure of the stream storage location information file. The stream storage location information file is made up of storage location information of each AVClip and Clip information constituting the Virtual Package. Each piece of storage location information is composed of identifiers of AVClips and Clip information and file paths indicating the storage locations of the AVClips and Clip information in the Local Storage 18. By referring to the storage location information, it is possible to check whether all AVClips and Clip information which constitute the Virtual Package have already been prepared when creating the Virtual Package.

The filesystem structure of the playback apparatus according to this embodiment is as described above. The following describes a software structure in the playback apparatus according to this embodiment.

Figure 14:
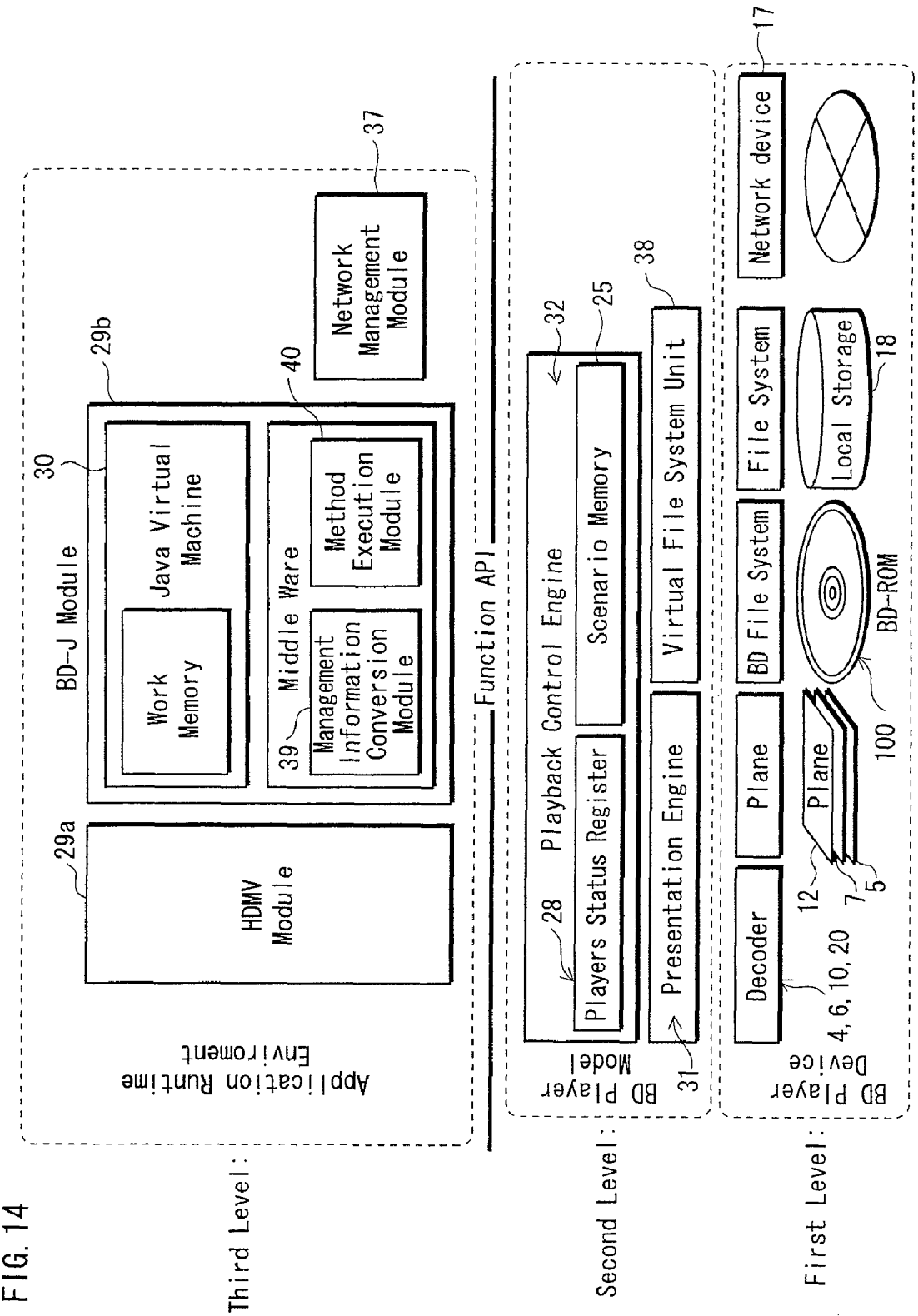
FIG. 14 depicts elements composed of hardware and software stored on a ROM 24 rearranged in a layer structure.

FIG. 14 depicts elements composed of hardware and software stored on the ROM 24 rearranged in a layer structure. As shown in FIG. 14, the layer structure of the playback apparatus is composed of a) a first layer (BD Player Device), b) a second layer (BD Player Model), and c) a third layer (Application Runtime Environment).

A hardware structure of the playback apparatus shown in FIG. 12 belongs to the first layer. The "BD Player Device" at the first layer in the drawing includes a "decoder" composed of the Video Decoder 4, the P-Graphics Decoder 6, the I-Graphics Decoder 10, and the Audio Decoder 16, a "plane" composed of the Video Plane 5, the Presentation Graphics Plane 7, and the Interactive Graphics Plane 12, the BD-ROM and its filesystem, and the Local Storage 18 and its filesystem.

The "BD Player Model" at the second tier is composed of b1) a layer for a Presentation Engine 31 and a Virtual FileSystem 38 and b2) a layer for a Playback Control Engine 32, with API functions being provided in relation to higher levels.

The PSR set 23 and the scenario memory 25 shown in FIG. 12 exist inside the Playback Control Engine 32.

The "Application Runtime Environment" at the third tier is composed of c1) a stack layer that includes an HDMV module 29a and a BD-J module 29b. The following describes the elements in this software structure.

<HDMV Module 29a, BD-J Module 29b>

The HDMV module 29a decodes navigation commands and executes function calls in relation to the Playback Control Engine 32 based on the decoding result.

The BD-J module 29b is a so-called Java™ platform having a hierarchical structure composed of d1-1) a Java™ virtual machine 30 and d1-2) middleware for the Java™ virtual machine to operate.

<Java™ Virtual Machine 30>

The Java™ virtual machine 30 loads xlet programs constituting applications into a work memory, decodes the xlet programs, and performs controls on lower layers in accordance with the decoding results. To perform these controls, the Java™ virtual machine 30 issues a method to the middleware, has the middleware replace the method with a function call corresponding to the BD playback apparatus, and issues the function call to the Playback Control Engine 32.

<Internal Structure of the Java™ Virtual Machine 30>

Figure 15:
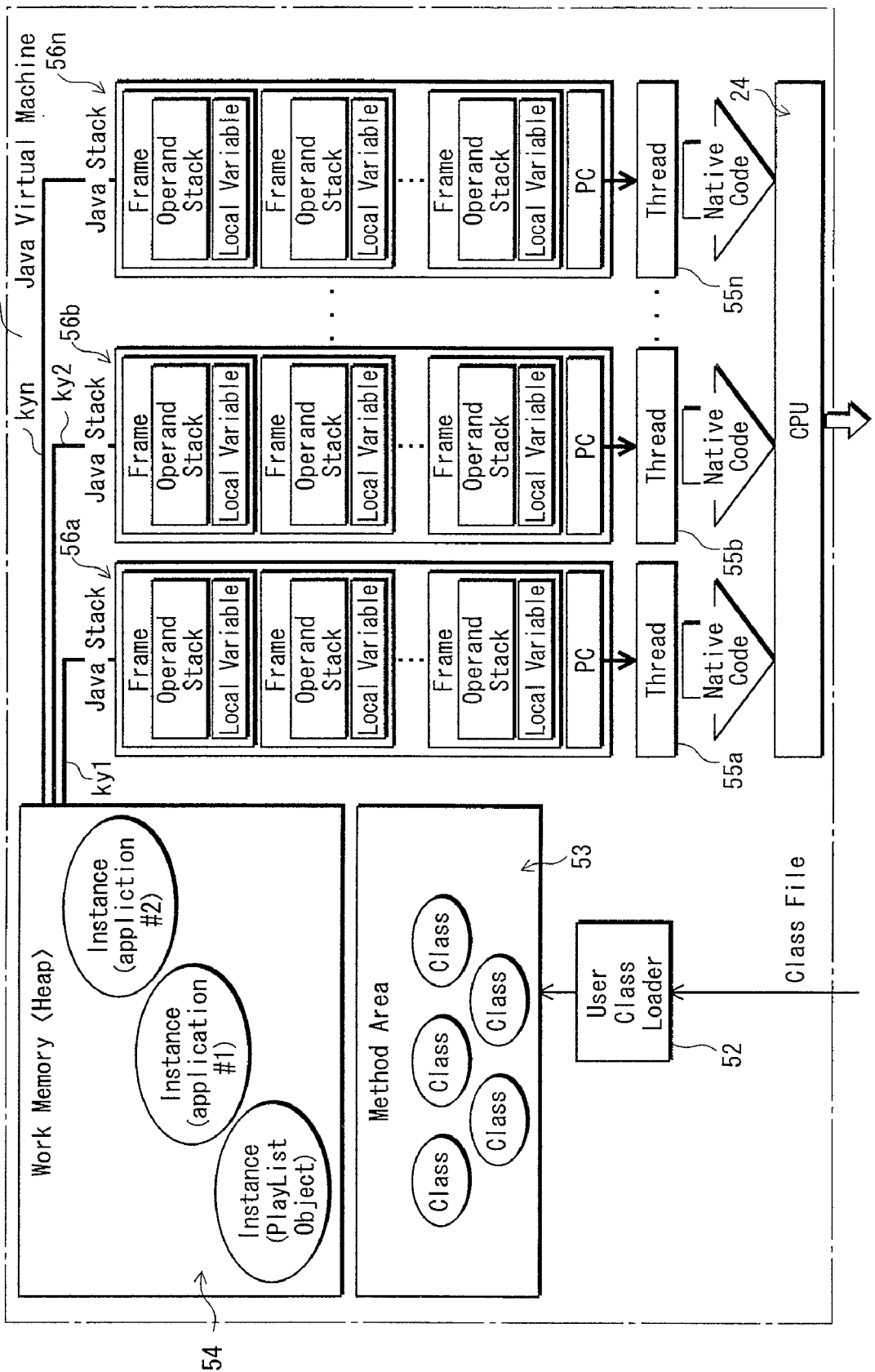
FIG. 15 shows an internal structure of a Java™ virtual machine 30.

The following describes an internal structure of the Java™ virtual machine 30. FIG. 15 shows the internal structure of the Java™ virtual machine 30. As shown in FIG. 15, the Java™ virtual machine 30 is constituted from the CPU 24 shown in FIG. 12, a user class loader 52, a method area 53, a work memory 54, threads $55a, 55b, \ldots, 55n$, and Java™ stacks $56a, 56b, \ldots, 56n$.

The user class loader 52 reads class files in Java™ archive files in the BDJA directory from the Local Memory 26 or the like and stores the read class files in the method area 53. The reading of a class file by the user class loader 52 is performed as a result of an application manager 36 sending a read instruction specifying a file path to the user class loader 52. If the file path indicates the Local Memory 26, the user class loader 52 reads a class file in a Java™ archive file constituting an application from the Local Memory 26 to the work memory 54. If the file path indicates a directory in a FileSystem, the user class loader 52 reads a class file in a Java™ archive file constituting an application from the BD-ROM or the Local Storage 18 to the work memory 54.

The method area 53 store class files read from the Local Memory 26 by the user class loader 52.

The work memory 54 is a so-called heap area storing instances of various class files. The work memory 54 stores instances corresponding to resident applications and class files read to the method area 53. Such an instance is an xlet program constituting an application that is made executable by placing the xlet program in the work memory 54.

The threads $55a, 55b, \ldots, 55n$ are logical execution entities for executing methods stored in the work memory 54. These threads perform calculations using local variables and arguments stored in operand stacks as operands, and store calculation results in local variables or operand stacks. The arrows $ky1, ky2, \ldots, kyn$ in the drawing symbolically indicate the supply of methods from the work memory 54 to the threads $55a, 55b, \ldots, 55n$. Whereas the CPU is the sole physical execution entity, there may be up to 64 logical execution entities or threads in the Java™ virtual machine 30. Threads can be newly created and existing threads deleted within this numerical limit, and the number of operational threads can be varied while the Java™ virtual machine 30 is operating. Being able to appropriately increase the number of threads also makes it possible to run instances in parallel using a plurality of threads for each instance, and thereby speed up the execution of instances.

The Java™ stacks $56a, 56b, \ldots, 56n$ exist in a one-to-one ratio with the threads $55a, 55b, \ldots, 55n$, and each has a program counter ("PC" in the drawing) and one or more frames. The program counters show which part of an instance is currently being executed. A frame is a stack-type area allocated to each call for a method, and is composed of an operand stack for storing arguments occurring at the time of the call and a local variable stack ("local variable" in the drawing) for use by the called method. Since frames are stacked on the Java™ stacks $56a, 56b, \ldots, 56n$ whenever a call is made, the frames of a method that calls itself recursively also get stacked one on top of the other.

The internal structure of the Java™ virtual machine is as described above. The Java™ virtual machine having the above structure serves as an event-driven execution entity. This completes the description of the Java™ virtual machine.

<Presentation Engine 31>

The Presentation Engine 31 executes AV playback functions. The AV playback functions of a playback apparatus are a traditional group of functions inherited from DVD players and CD players, including Play, Stop, Pause On, Pause Off, Still Off, Forward Play (speed), Backward Play (speed), Audio Change, Subtitle Change, and Angle Change. To realize these AV playback functions, the Presentation Engine 31 controls the Video Decoder 4, the P-Graphics Decoder 6, the I-Graphics Decoder 10, and the Audio Decoder 16 to decode a portion of an AVClip read to the Read Buffer 2 that corresponds to a desired time. By having the place indicated by PSR8 (current PTM) decoded as the desired time, arbitrary points in an AVClip can be rendered playable.

<Playback Control Engine 32>

The Playback Control Engine (PCE) 32 executes various functions including (i) playback controls on PlayLists and (ii) acquiring/setting the status of the PSR set 23. The playback control function for PLs involves having the Presentation Engine 31 execute Play and Stop out of the above AV playback functions, in accordance with current PL information and Clip information. These functions (i) and (ii) are executed according to function calls from the HDMV module 29a and the BD-J module 29b.

Synchronization of the processing by the Playback Control Engine 32 with the processing by the Java™ virtual machine is described next. The Playback Control Engine 32 executes processing based on PL information when a function is called. This processing is performed for the duration of the AVClip for playback, whether the playback time is 15 minutes or 30 minutes. A problem here is a time lag between when the Java virtual machine 30 returns a success response and when the Playback Control Engine 32 actually ends the processing. The Java virtual machine 30, being an event-driven execution entity, returns a response indicating whether playback was successful or not immediately after the call, whereas the Playback Control Engine 32 ends the playback of the AVClip and PlayItem after the 15 or 30-minute playback duration has elapsed. Thus, the time at which a success response is returned to an application cannot be used as a basis for gauging the end of processing 15 or 30 minutes later. Gauging the end of processing becomes all the more difficult when fast-forwarding or rewinding is performed during PL playback since the playback time of 15 or 30 minutes is then subject to change. In view of this, the Playback Control Engine 32 outputs events indicating the end of PlayItem and AVClip playback to an application when playback of a respective PlayItem or AVClip ends. This output enables the application to know the points at which the Playback Control Engine 32 concluded PlayItem and AVClip playback.

This completes the description of the Java™ virtual machine, the Network Device 31, and the Playback Control Engine 32. The controls on the Playback Control Engine 32 by the Java virtual machine are performed via a Virtual Package. To realize the controls on the Playback Control Engine 32 via a Virtual Package, the playback apparatus includes the following elements (a network management module 37, a Virtual FileSystem unit 38, a management information conversion module 39, and a method execution module 40). These elements are described next.

<Network Management Module 37>

The Network Management Module 37 downloads data required for creating Virtual Packages from websites administrated by the providers of movie works, in accordance with method calls from applications. This data includes stream storage location information files, PlayList information, Clip information, and AVClips. When download requests are made by applications in the Work memory 54, the network management module 37 downloads data required for creating Virtual Packages via a network and writes the downloaded data to the Local Storage 18.

An order of writing in the download is: a stream storage location information file .PlayList information .a plurality of pieces of Clip information .a plurality of AVClips.

Once the writing of the PlayList information to the plurality of pieces of Clip information has completed, the creation of a Virtual Package becomes possible.

<Virtual FileSystem Unit 38>

The Virtual FileSystem unit 38 is an element belonging to the second layer that creates Virtual Packages in accordance with method calls from applications. The creation of a Virtual Package includes a process to manage a status of each AVClip constituting the Virtual Package and a process to generate Virtual Package information.

1. Virtual Package Information

Virtual Package information expands volume management information on the BD-ROM. The volume management information referred to here defines a directory—file structure existing on a recording medium, and is composed of directory management information relating to directories and file management information relating to files.

Figure 16:
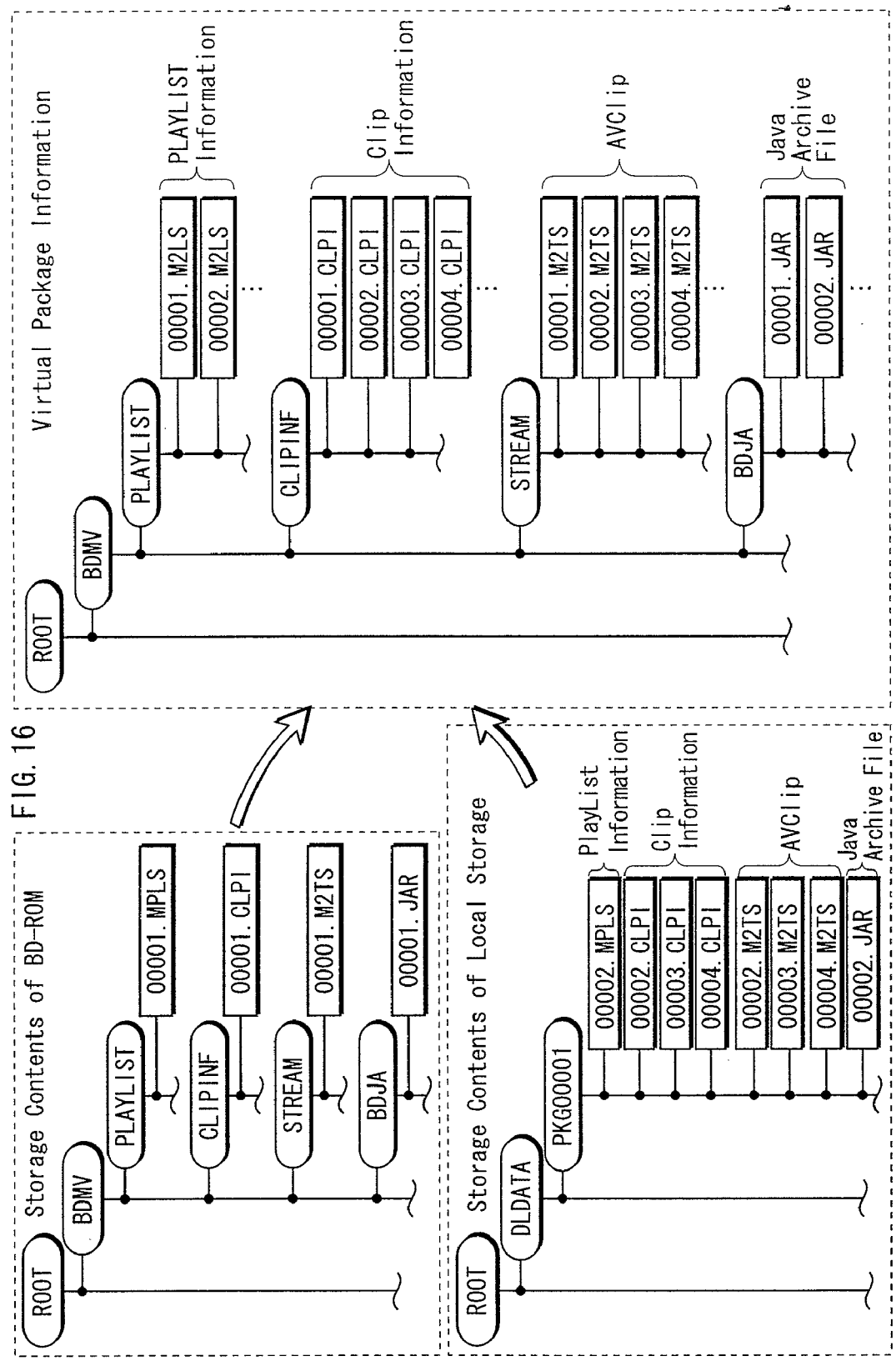
FIG. 16 shows an exemplary creation of Virtual Package information by a Virtual FileSystem unit 38.

The Virtual Package information expands the directory—file structure on the BD-ROM, by adding new file management information to the volume management information showing the directory—file structure of the BD-ROM. The file management information added to the volume management information relates to PlayList information, Clip information, and AVClips existing on the Local Storage 18. Generating the Virtual Package information to which this file management information has been added and providing this Virtual Package information to the Playback Control Engine 32 enables the Playback Control Engine 32 to recognize the PlayList information, the Clip information, and the AVClips stored on the Local Storage 18 as existing on the BD-ROM. FIG. 16 shows an exemplary generation of Virtual Package information by the Virtual FileSystem unit 38. At the top left of FIG. 16 is the directory—file structure on the BD-ROM, this being the same as FIG. 2. At the bottom left is the directory—file structure on the Local Storage 18, this being the same as FIG. 13A. File management information relating to the PlayList information, the Clip information, and the AVClips on the Local Storage 18 is added to the volume management information on the BD-ROM.

Specifically:

i) file management information relating to a PlayList (00002.MPLS) on the Local Storage 18 is added to the directory management information of the MPLS directory in the BD volume management information;

ii) file management information relating to Clip information#2, #3, and #4 (00002.CLPI, 00003.CLPI, 00004.CLPI) on the Local Storage 18 is added to the directory management information of the CLPI directory in the BD volume management information; and iii) file management information relating to AVClips#2, #3, and #4 (00002.M2TS, 00003.M2TS, 00004.M2TS) on the Local Storage 18 is added to the directory management information of the STREAM directory in the BD volume management information.

Virtual Package information is thus obtained. In other words, Virtual Package information is volume management information that has been generated as a result of the above addition.

This Virtual Package information is then provided to the Playback Control Engine 32, which is thereby able to treat the PlayList information, the Clip information, and the AVClips on the Local Storage 18 on an equal basis with PlayList information, Clip information, and AVClips on the BD-ROM. The generation of Virtual Package information is as described above. The following describes status management by the Virtual FileSystem unit 38.

2. Enable and Disable

"Status management" mentioned here is management of whether an AVClip which constitutes a Virtual Package is in an enable status or a disable status. When a piece of PlayItem information in PlayList information is targeted for multi-angle, each AVClip which forms a multi-angle section is subjected to enable/disable status management. When Sub-PlayItem information is present in PlayItem information, an AVClip indicated by a Clip_information_file_name of the SubPlayItem information is subjected to enable/disable status management, too.

Figure 17:
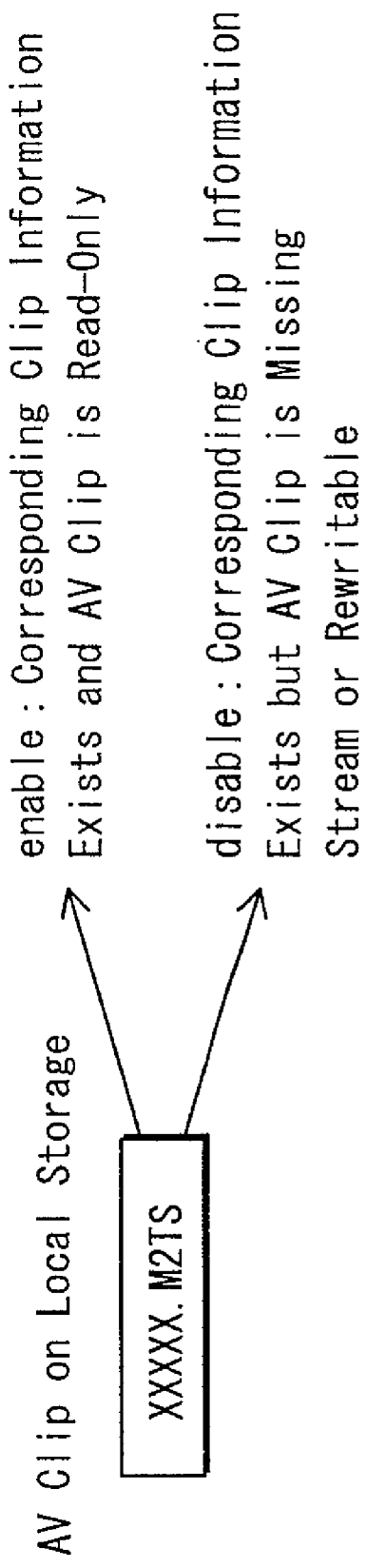
FIG. 17 shows an example of status management by the Virtual FileSystem unit 38.

FIG. 17A shows an example of status management by the Virtual FileSystem unit 38. As illustrated, an AVClip has two statuses that are "enable" and "disable". "Enable" indicates that Clip information and an AVClip corresponding to the Clip information exist on the Local Storage 18 and the AVClip is set in Read Only Mode.

Meanwhile, "disable" indicates that Clip information exists on the Local Storage 18 but an AVClip corresponding to the Clip information is either absent on the Local Storage 18 (Missing Stream) or, even if present, deletable.

An AVClip in the disable status is treated as deletable. Accordingly, when the capacity of the Local Storage 18 is not enough, an AVClip in the disable status is subjected to deletion.

Therefore, when an AVClip is downloaded to the Local Storage 18, the Playback Control Engine 32 treats the downloaded AVClip as nonexistent, unless the Virtual FileSystem unit 38 changes the AVClip to the enable status. Since the Playback Control Engine 32 does not recognize the AVClip on the Local Storage 18 in the absence of an action of the Virtual FileSystem unit 38, the Playback Control Engine 32 can be prevented from proceeding in playback in an unstable state.

3. Read Only Mode and Cancellation

Read Only Mode is described next. The change to Read Only Mode is performed by rewriting file management information in volume management information on the Local Storage 18. A target of this rewriting is file management information in the PACKAGE00001 directory under the DLDAT directory in the Local Storage 18. Rewriting all file attributes in such file management information to Read-only, an AVClip on the Local Storage 18 can be kept from being rewritten. As a result, the AVClip will not be rewritten even when an application tries to access the AVClip on the Local Storage 18 during playback by the Playback Control Engine 32, with it being possible to maintain the sameness of the AVClip during playback.

When an AVClip on the Local Storage 18 is made recognizable by the Playback Control Engine 32, an attribute of a file storing this AVClip on the Local Storage 18 is set to Read-only. Accordingly, even if an application on the Java™ virtual machine directly accesses the Local Storage 18, the contents of the AVClip will not be changed.

Cancellation of Read Only Mode is explained next. Cancellation of Read Only Mode is performed by rewriting file management information in volume management information on the Local Storage 18, in the same way as setting to Read Only Mode. A target of this rewriting is file management information in the PACKAGE00001 directory under the DLDAT directory in the Local Storage 18. By changing an attribute of such file management information from Read-only to Re-writable, an AVClip on the Local Storage 18 is made rewritable any time. Accordingly, by changing the file management information in the Local Storage 18 to Re-writable immediately after the playback by the Playback Control Engine 32 ends, the AVClip on the Local Storage 18 can be targeted for deletion. This completes the description of the status management.

4. Relationship between Status Management and Virtual Package Information

Figure 18:
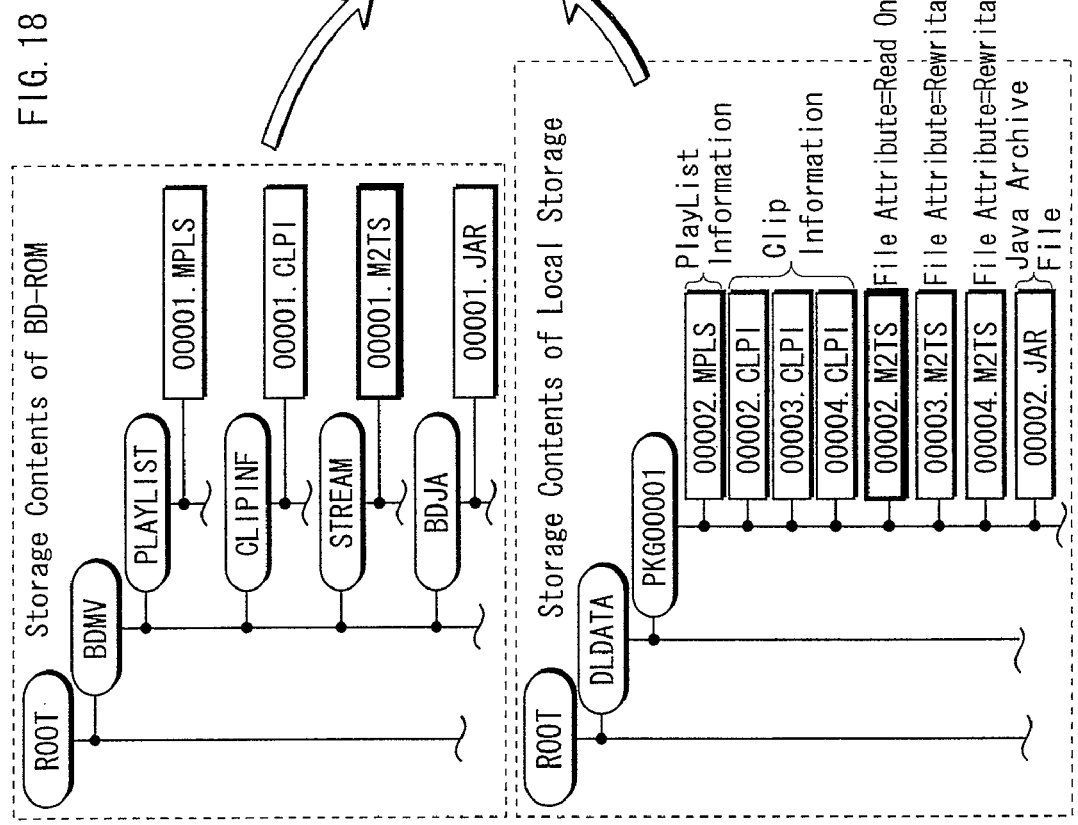
FIG. 18 shows generation of Virtual Package information that reflects status management.

The contents of this status management can be reflected onto the generation of the Virtual Package information. Which is to say, file management information for an AVClip which is set to the disable status in the status management is not added to the volume management information of the BD-ROM, and only file management information for an AVClip which is set to the enable status in the status management is added to the volume management information of the BD-ROM. Providing such generated Virtual Package information to the Playback Control Engine 32 enables the Playback Control Engine 32 to recognize only the AVClip which is in the enable status. Suppose, of AVClip#1 on the BD-ROM and AVClips#2, #3, and #4 on the Local Storage 18, AVClips#1 and #2 are in the enable status whereas AVClips#3 and #4 are in the disable status. This being the case, the Virtual FileSystem unit 38 generates Virtual Package information as shown in FIG. 18. FIG. 18 shows the generation of Virtual Package information that reflects the status management. In the drawing, file management information for AVClip#2 is added to the directory management information in the STREAM directory in the BD volume management information, but file management information for AVClips#3 and #4 is not added to the directory management information in the STREAM directory in the BD volume management information. When, of the four AVClips shown at the bottom left of FIG. 18, 00002.M2TS corresponding to AVClip#2 is in the enable status and 00003.M2TS and 00004.M2TS corresponding to AVClips#3 and #4 are in the disable status, a file attribute of 00002.M2TS corresponding to AVClip#2 is set to Read-only whilst file attributes of 00003.M2TS and 00004.M2TS corresponding to AVClips#3 and #4 are set to Re-writable in the Local Storage 18, as shown in the drawing. As a result of providing such generated Virtual Package information to the Playback Control Engine 32, the Playback Control Engine 32 will not recognize AVClips#3 and #4 which are in the disable status.

As mentioned above, when Clip information exists but a corresponding AVClip does not exist on the Local Storage 18, the AVClip is set to the disable status. However, if not only the AVClip but also the Clip information does not exist on the Local Storage 18 despite that a file path corresponding to the Clip information is present in a stream storage location information file, it is impossible to create a Virtual Package. That is, the absence of essential Clip information in a Virtual Package affects the entire Virtual Package.

5. Provision of Virtual Package Information

The following describes how the Virtual Package information generated in the above processes 1 to 4 is provided.

Figure 19:
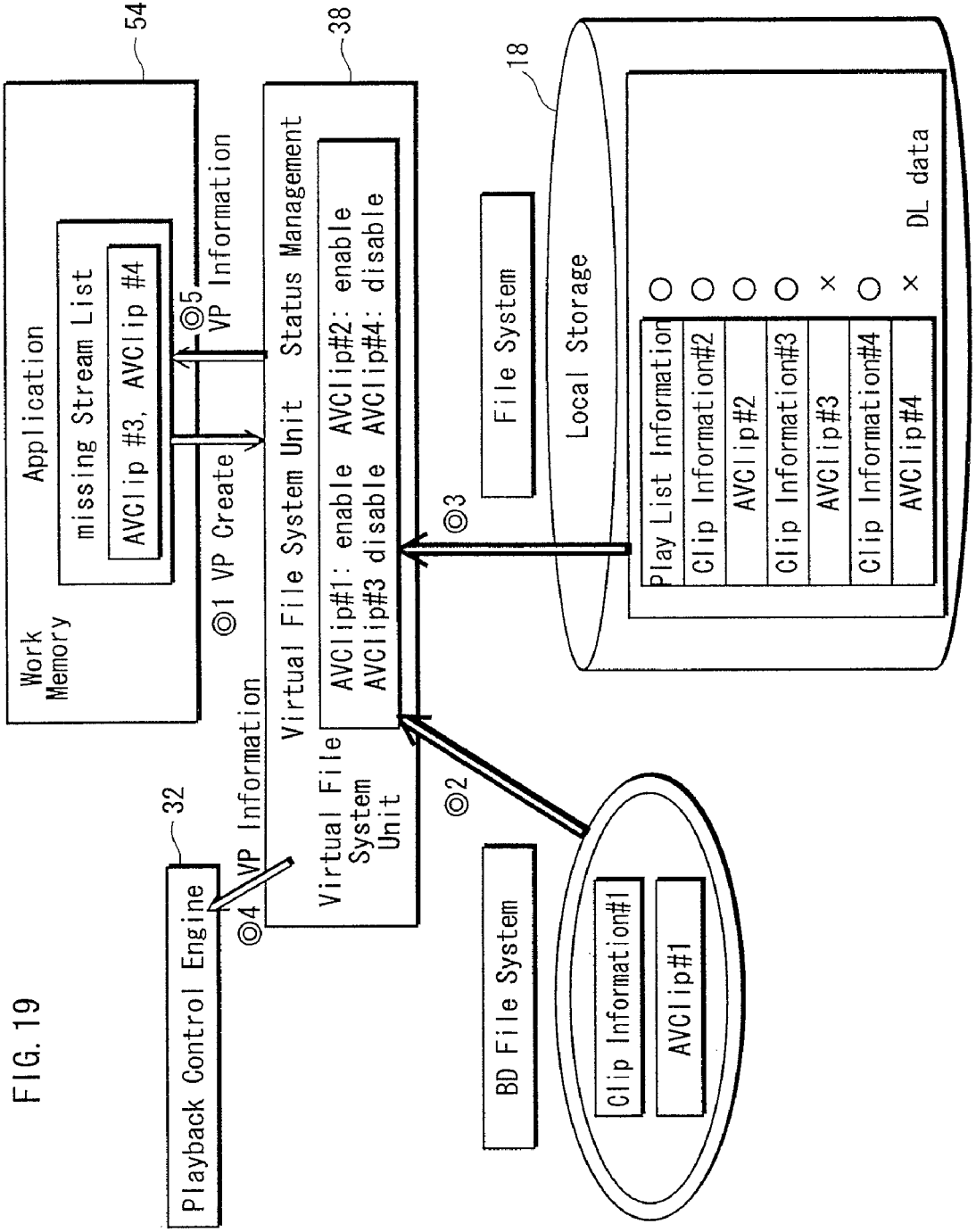
FIG. 19 shows creation of a Virtual Package by the Virtual FileSystem unit 38 when a network management module 37 is in a process of downloading.

Suppose PlayList information, Clip information#2 to #4, and AVClip#2 have already been downloaded but AVClips#3 and #4 have not been downloaded, as shown in FIG. 18. If the generation of Virtual Package information is requested in such a state, the Virtual FileSystem unit 38 performs an operation shown in FIG. 19. FIG. 19 shows the creation of the Virtual Package by the Virtual FileSystem unit 38 in the case where the download by the network management module 37 is still in progress. When the creation of the Virtual Package is requested in the state shown in the drawing (.1VPCreate), the Virtual FileSystem unit 38 reads directory management information and file management information from the BD-ROM and the Local Storage 18 (.2, 3), and creates the Virtual Package. The Virtual FileSystem unit 38 then provides the Virtual Package information to the Playback Control Engine 32 (.4), and to the application (.5). This enables the Playback Control Engine 32 to create one stream sequence from the AVClips on the BD-ROM and the Local Storage 18 through the Virtual Package.

The Virtual Package information provided to the application indicates that Clip information#3 and #4 exist but AVClips#3 and #4 do not exist. Accordingly, the application can recognize that AVClips#3 and #4 constitute the stream sequence but are nonexistent streams (Missing Streams).

This completes the description of the Virtual FileSystem unit 38.

<Management Information Conversion Module 39>

The management information conversion module 39 is a piece of middleware in the BD-J Module 29b. When an application requests generation of an instance of PlayList information in the Virtual Package, the management information conversion module 39 generates the instance of the PlayList information in JMF format in the Work memory 54 of the Java™ virtual machine (PlayList object in the Work memory 54 shown in FIG. 15).

This instance (PlayList object) has a "data unit" which is the PlayList information and a plurality of "method units".

A plurality of methods in a PlayList object have the Playback Control Engine 32 perform various playback operations such as Play, Stop, Pause On, Pause Off, Still Off, Forward Play (speed), Backward Play (speed), Audio Change, Subtitle Change, and Angle Change. By calling these methods, the application can initiate or stop playback of a stream sequence defined by the PlayList.

The PlayList information played back by the PlayList object is described below. This PlayList information is PlayList information existing on the Local Storage 18.

While PlayList information on the BD-ROM refers only to AVClips on the BD-ROM, PlayList information on the Local Storage 18 is called "Progressive PlayList information" that refers to both AVClips on the BD-ROM and AVClips on the Local Storage 18.

Suppose the Progressive PlayList information is made up of five pieces of PlayItem information#1 to #5. When the three pieces of PlayItem information#1-#3 refer to Clip information on the BD-ROM whilst the remaining two pieces of PlayItem information#4 and #5 refer to Clip information on the Local Storage 18, the Progressive PlayList information can define one stream sequence from an AVClip on the BD-ROM and AVClips on the Local Storage 18, as shown in FIG. 20A.

FIG. 20A shows a PlayList playback time axis that is defined by PL information stored on the Local Storage. The first tier in the drawing shows a playback time axis of an AVClip recorded on the BD-ROM, and the second tier shows a PlayList playback time axis defined by PL information stored on the Local Storage. The third tier shows a playback time axis of AVClip#2 recorded on the Local Storage, the fourth tier shows a playback time axis of AVClip#3 recorded on the Local Storage, and the fifth tier shows a playback time axis of AVClip#4 recorded on the Local Storage.

When PlayItem information#4, PlayItem information#5, and PlayItem information#6 in the PlayList information specify AVClip#2, AVClip#3, and AVClip#4 as playback sections, then the Progressive PlayList information can define the AVClip on the BD-ROM and the AVClips on the Local Storage 18 as one stream sequence.

Here, the term "Progressive" in the Progressive PlayList information means that, if at least one of the AVClips referenced by the PlayItem information which constitutes the PlayList information is in the enable status, the playback of the stream sequence can be started even when the other AVClips are in the disable status.

FIG. 20B shows a concept of Progressive PlayList information. The second to fifth tiers in FIG. 20B correspond to the second to fifth tiers in FIG. 20A. In the case where the AVClip at the third tier in FIG. 20A and FIG. 20B is in the enable status but the AVClips at the fourth and fifth tiers are in the disable status, of the four AVClips referenced by the Progressive PlayList information, AVClips#1 and #2 are playable though AVClips#3 and #4 are not playable. Accordingly, the playback of the stream sequence can be started. Thus, Progressive PlayList information has a characteristic in that playback can be started speculatively if at least one AVClip is playable.

In a stage where the Virtual FileSystem unit 38 has created a Virtual Package, when an application on the Work memory 54 requests generation of an instance of the Progressive PlayList information shown in FIG. 20, the management information conversion module 39 performs processing shown in FIG. 21. FIG. 21 shows generation of an instance by the management information conversion module 39.

When the application calls a generation method to request the generation of an instance of PlayList information included in the Virtual Package (.1), the management information conversion module 39 reads the PlayList information from the scenario memory 25 (.2), and generates a PlayList object by setting this Progressive PlayList information as a data unit and adding method units, on the Work memory 54 (.3). Once such a PlayList object has been obtained on the Work Memory 54, the application can instruct the Playback Control Engine 32 to play back the stream sequence defined by the PlayList information, by calling a method of the PlayList object.

FIG. 22 shows a call of a Play method in the PlayList object. By calling a Play method (.4), a PL playback function call is made to the Playback Control Engine 32 (.5). As a result, the Playback Control Engine 32 reads the AVClips referenced by the PlayList information which is requested to be played back (AVClip#1 on the BD-ROM and AVClip#2 on the Local Storage 18) (.6, 7), and supplies these AVClips to the decoder in sequence. This completes the description of the management information conversion module 39.

<Method Execution Module 40>

The method execution module 40 is one of the elements of the middleware in the BD-J Module 29b, and executes various methods in response to method calls from an application existing in the Java™ virtual machine 30. There are various methods that are executed by the method execution module 40. Characteristic methods used in the present invention are a getMissingStreams method, an enableClip method, a disableClip method, and a getDisableClips method. These methods are explained below.

1. getMissingStreams Method

The getMissingStreams method is a method for inquiring of the Virtual FileSystem unit 38 about the existence of any AVClip which is a Missing Stream, while download by the network management module 37 is still in progress.

Suppose the Virtual Package information shown in FIG. 19 is provided to an application on the Work Memory 54. Missing Streams known at the time of the Virtual Package creation are AVClips#3 and #4. After this, when the application calls the getMissingStreams method to inquire of the Virtual File- System unit 38 about latest Missing Streams, the method execution module 40 performs the processing shown in FIG. 23.

Figure 23:
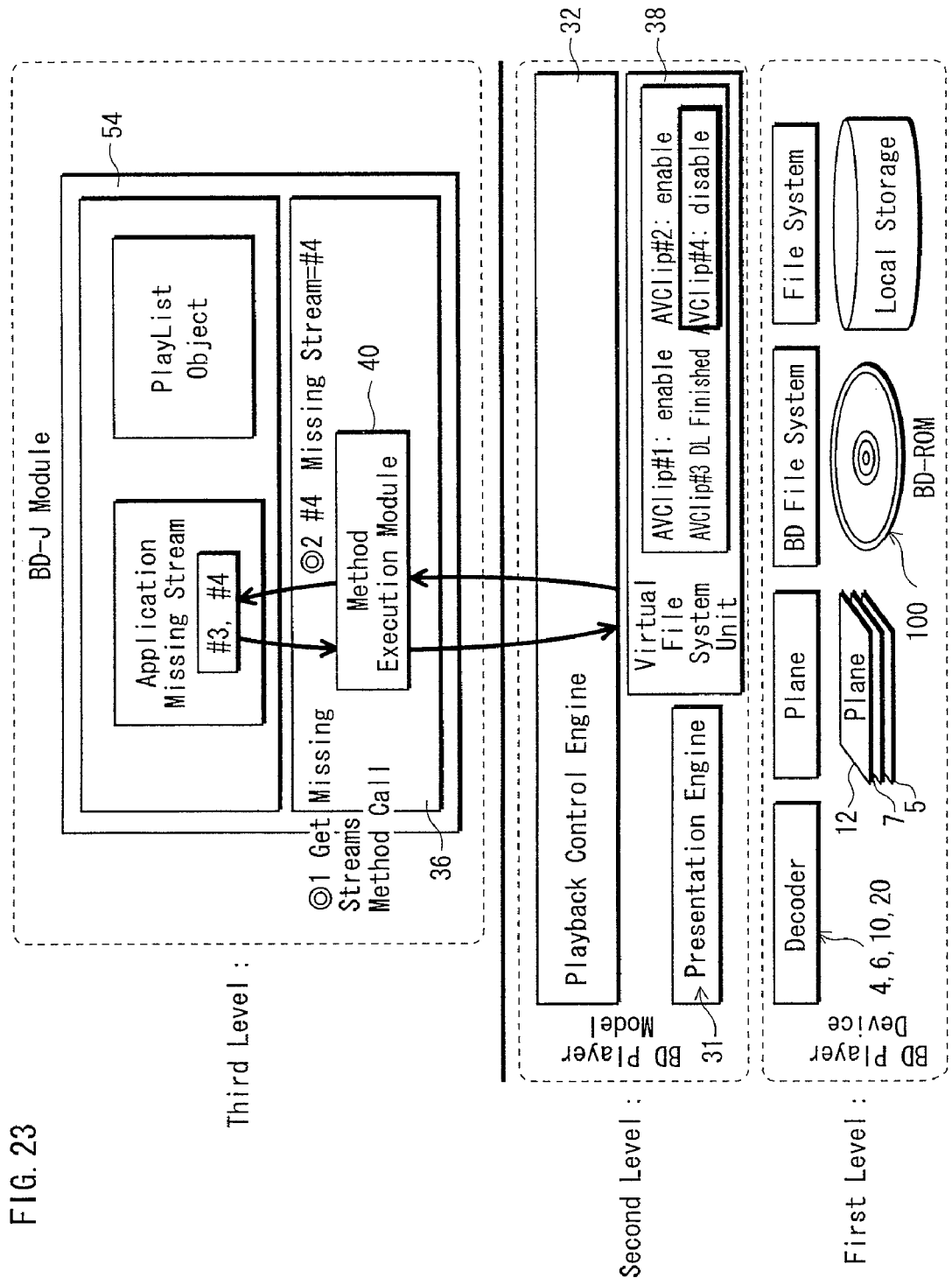
FIG. 23 schematically shows a result of an inquiry by a getMissingStreams method.

FIG. 23 schematically shows a result of this inquiry. In the drawing, the getMissingStream method is called as shown by 0.1, and the Virtual FileSystem unit 38 returns AVClip#4 as a return value. Before the getMissingStreams method call, AVClips#3 and #4 are Missing Streams. After the getMissingStreams method call, on the other hand, only AVClip#4 is a Missing Stream. This indicates that AVClip#3 is no longer a Missing Stream (i.e. the download of AVClip#3 has completed). In this way, an extent of elimination of Missing Streams as the download progresses can be detected.

2. enableClip Method

The enableClip method is a method for, when an AVClip which was a Missing Stream at the time of Virtual Package creation has become no longer a Missing Stream, setting the AVClip to the enable status.

Figure 24:
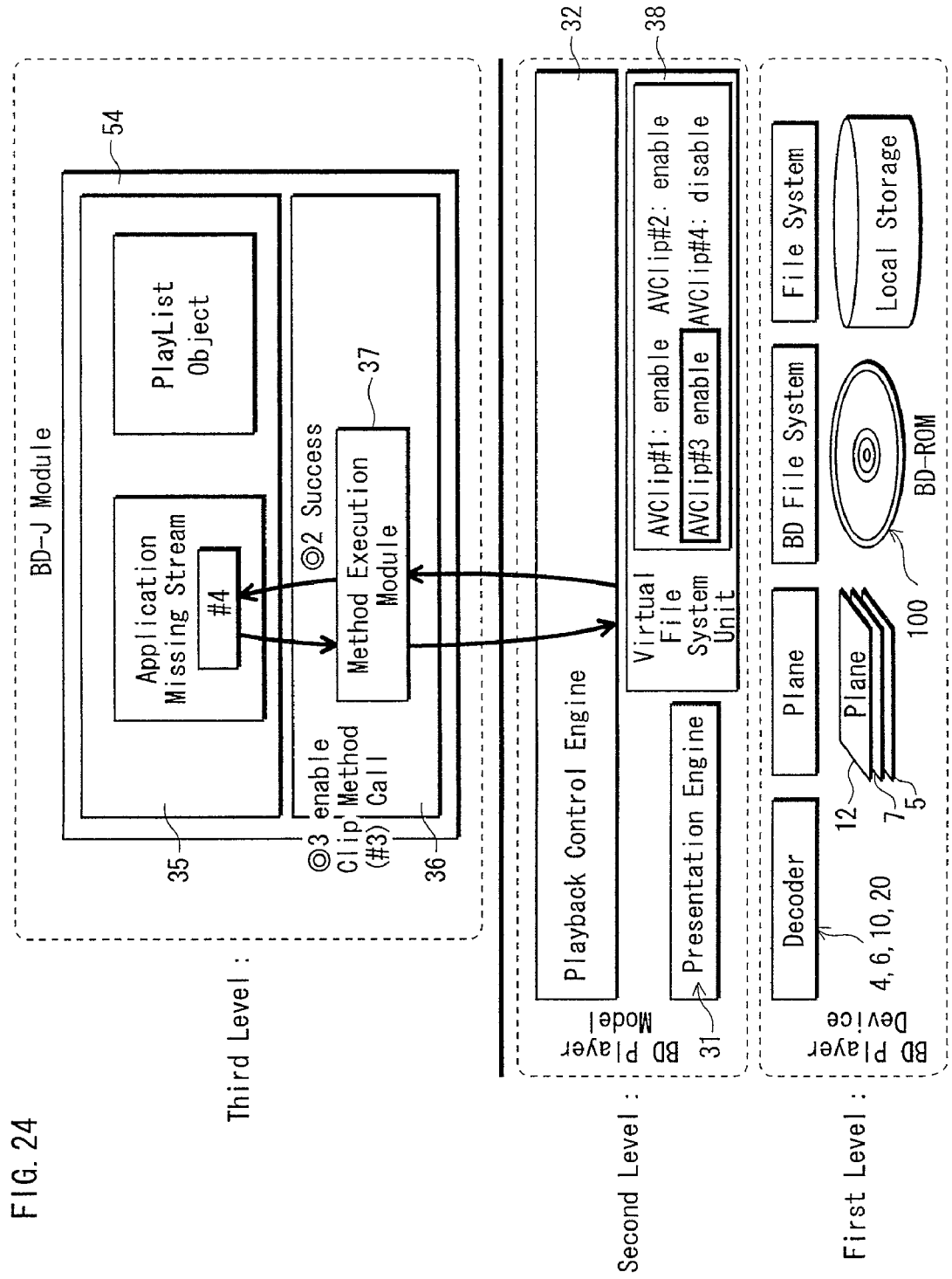
FIG. 24 schematically shows a call of an enableClip method.

Suppose the enableClip method is called for AVClip#3 as it becomes apparent that AVClip#3 is no longer a Missing Stream in FIG. 23. In this case, the method execution module 40 performs processing shown in FIG. 24. FIG. 24 schematically shows a call of the enableClip method. When the enableClip method is called for AVClip#3 (.3), the application has AVCLip#3 changed to the enable status, and a success response is returned to the application (.2). In this way, AVClips which are no longer Missing Streams in the creation of a Virtual Package can be changed to the enable status.

When an AVClip is set to the enable status, the method execution module 40 has Virtual Package information including the AVClip which is newly set to the enable status, provided to the application and the Playback Control Engine 32. This allows the Playback Control Engine 32 and the application to recognize and access the AVClip newly set to the enable status.

3. disableClip Method

Figure 25:
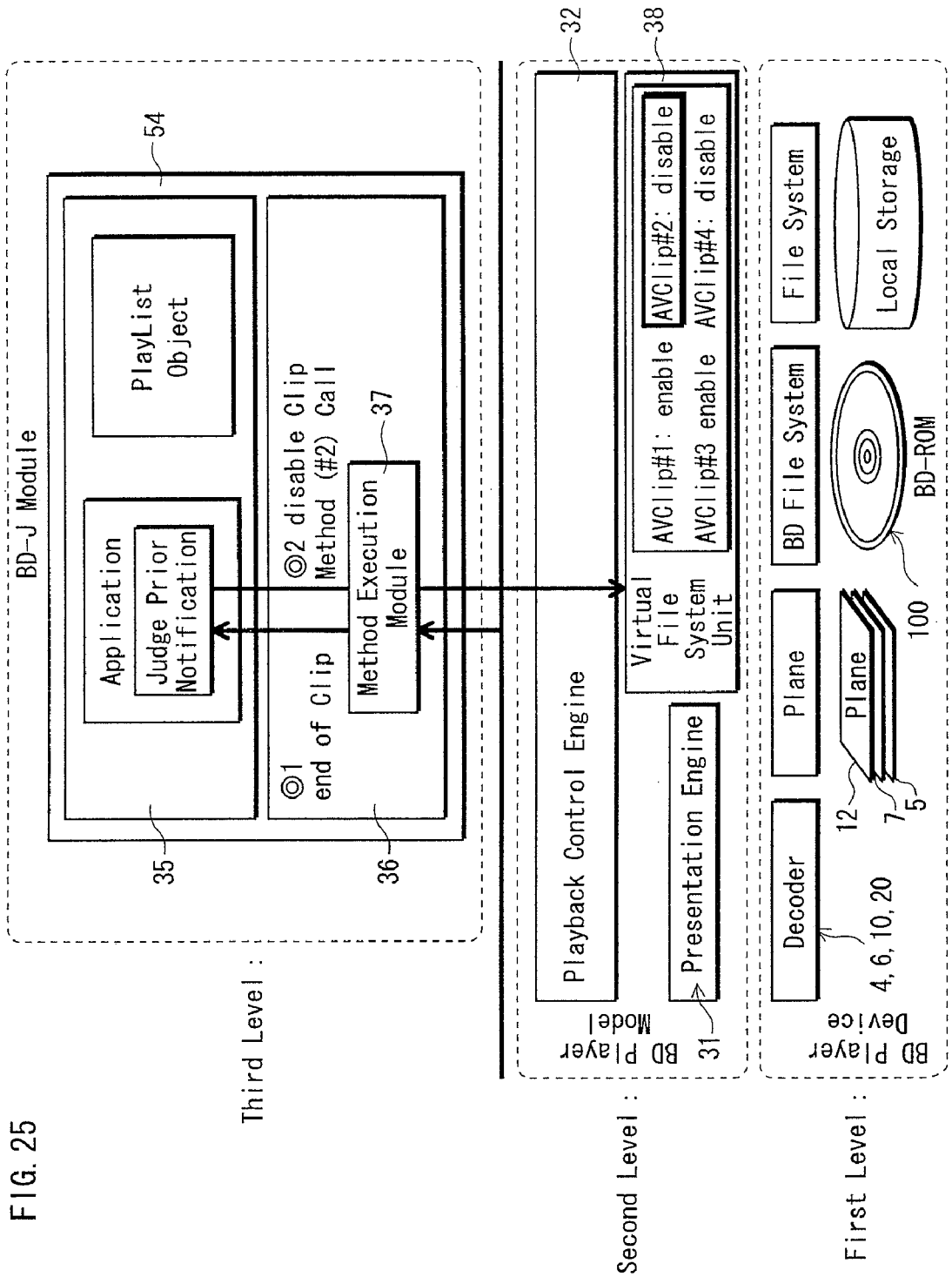
FIG. 25 schematically shows a call of a disableClip method.

The disableClip method is a method for setting an AVClip which is in the enable status, to the disable status. Suppose an event that the playback of AVClip#2 has completed is notified by the Playback Control Engine 32 during the playback of the Progressive PlayList information shown in FIG. 20. In this case, upon the notification of the completion of the playback of AVClip#2, the method execution module 40 performs processing shown in FIG. 25. FIG. 25 schematically shows a call of the disableClip method. In the drawing, when notified of the completion of the playback of AVCilp#2 as a result of the progress of the playback by the Playback Control Engine 32 using an end of Clip event (.1), the application calls the disableClip method for AVClip#2 (.2) to change AVClip#2 to the disable status. In this way, when the playback of the AVClip has completed, the AVClip can be changed to the disable status. AVClip#2 changed to the disable status is targeted for deletion. In the case where AVClips which constitute trailers are sequentially downloaded, by setting AVClips which have been played back in a stream sequence defined by Progressive PlayList information to the disable status one by one, these AVClips can be submitted for deletion. When an AVClip is set to the disable status, the method execution module 40 has Virtual Package information from which the AVClip newly set to the disable status has been removed, provided to the application and the Playback Control Engine 32. As a result, the Playback Control Engine 32 will not recognize the AVClip set to the disable status. It should be noted here that, when deleting an AVClip on the Local Storage 18, the middleware checks a write permission of an application which requests the deletion before executing the deletion, in order to prevent an erroneous loss of AVClips.

4. getDisableClips Method

The getDisableClips method is a method for inquiring about the existence of any AVClip in the disable status. By calling this method, an application can obtain information as to whether any AVClip is currently in the disable status.

One example of use is given below. Upon receiving a chapter skip request from a user during playback of a Progressive PlayList, the application uses this method to judge whether a jump destination AVClip is in the disable status. If the AVClip is in the disable status, a warning message such as "you cannot jump to this chapter because download is not completed" is displayed without performing a chapter skip. In this way, special playback such as a chapter skip can be performed during playback of a Progressive PlayList.

This completes the description of the methods executed by the method execution module 40.

Details of processing of the aforementioned elements are described below, with reference to flowcharts.

Figure 26:
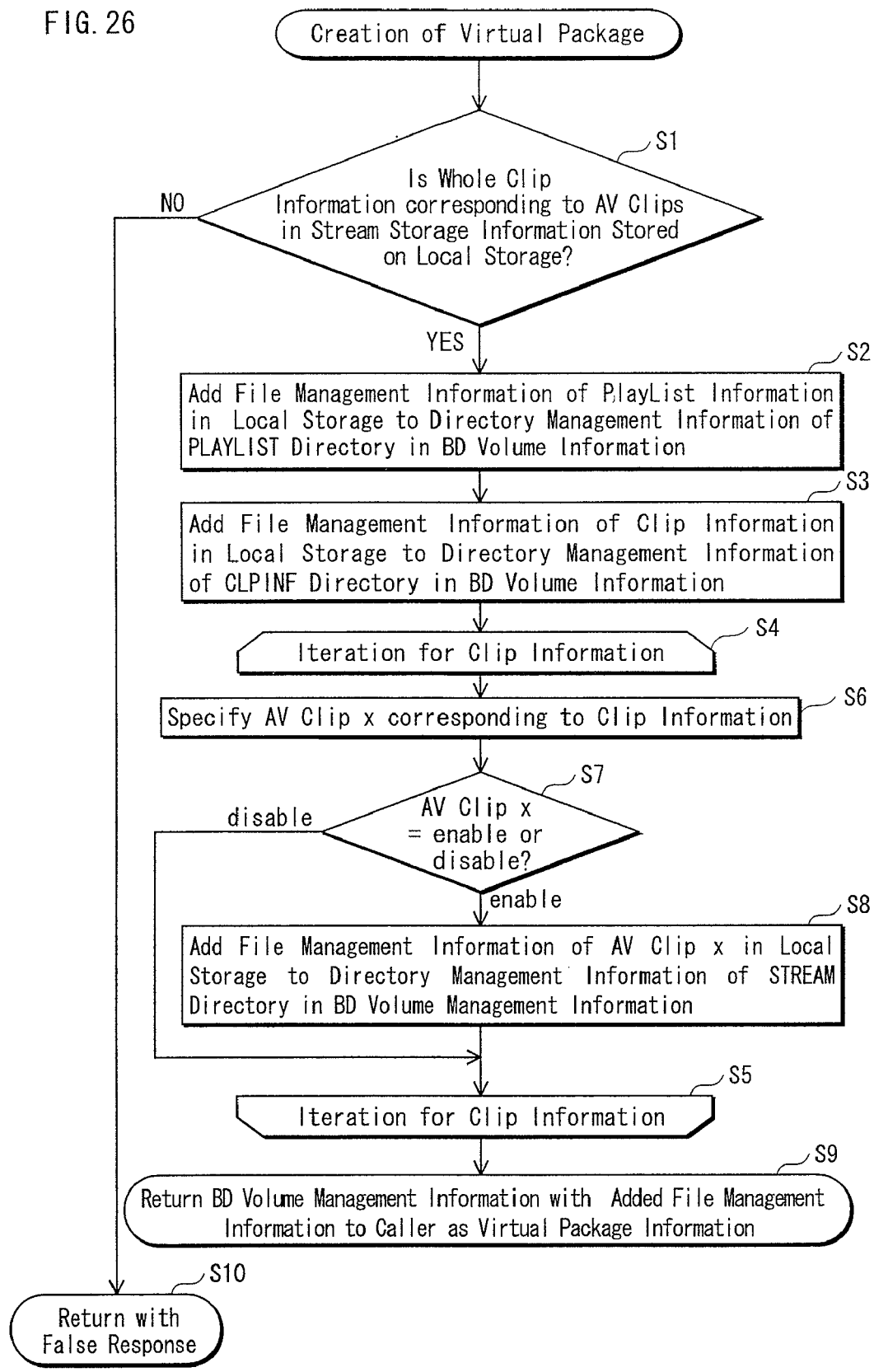
FIG. 26 is a flowchart of processing when creating a Virtual Package.

FIG. 26 is a flowchart showing a procedure when creating a Virtual Package. A judgment is made as to whether whole Clip information corresponding to AVClips stored in a stream storage location information file is stored on the Local Storage 18 (step S1). If there is any Clip information which is not present, a false response is returned to a call of a Virtual Package by an application (step S10). When not only the AVClips but also the Clip information does not exist in the Local Storage despite that a file path corresponding to the Clip information is included in the stream storage location information file, it is impossible to create a Virtual Package.

If all pieces of Clip information written in the stream storage location information file are stored on the Local Storage 18 (step S1: YES), on the other hand, file management information of PlayList information in the Local Storage 18 is added to directory management information of a PLAYLIST directory in BD volume management information (step S2), and file management information of Clip information in the Local Storage 18 is added to directory management information of a CLPINF directory in the BD volume management information (step S3). After this, a loop of steps S4 to S8 is executed. This loop repeats steps S6 to S8 for each piece of Clip information on the Local Storage 18 (steps S4, S5). A piece of Clip information subjected to the operation of the loop is denoted as Clip information x.

In the loop, an AVClip corresponding to Clip information x is specified (step S6), and a judgment is made as to whether this AVClip is in the enable status or the disable status (step S7). If the AVClip is in the enable status, file management information of AVClip x on the Local Storage 18 is added to directory management information of a STREAM directory in the BD volume management information (step S8). If the AVClip is in the disable status, on the other hand, step S8 is skipped. As a result of repeating the above operation for each piece of Clip information and AVClip, file management information for each AVClip which is in the enable status is added to the BD volume management information. The BD volume management information obtained as a result of this addition is Virtual Package information. The Virtual Package information is provided to the application which has called the Virtual Package and the Playback Control Engine 32 (step S9). This completes the procedure.

FIG. 27A is a flowchart showing a procedure when calling the enableClip method. When this method is called, AVClip y which is to be set to the enable status is specified from an argument in the call (step S14), and judgments of steps S15 and S16 are performed in this order. Step S15 is a judgment as to whether AVClip y is stored on the Local Storage 18, and step S16 is a judgment as to whether a file path of AVClip y is written in the stream storage location information file. Any of when AVClip y is not stored on the Local Storage 18 and when the file path of AVClip y is not written in the stream storage location information file, a false response is returned to the caller, and the procedure ends (step S19). If AVClip y is stored on the Local Storage 18 and the file path of AVClip y is written in the stream storage location information file, AVClip y is set to the enable status. Also, a file attribute of a file storing AVClip y in the Local Storage 18 is set to Read-Only, to set AVClip y to Read Only Mode (step S17). After this, a success response is returned (step S18).

FIG. 27B is a flowchart showing a procedure when calling the disableClip method. When this method is called, AVClip y which is to be set to the disable status is specified from an argument in the call (step S21), and judgments of steps S22 and S23 are performed in this order. Step S22 is a judgment as to whether AVClip y is being played back, and step S23 is a judgment as to whether a file path of AVClip y is not written in the stream storage location information file. Any of when AVClip y is being played back and when the file path of AVClip y is not written in the stream storage location information file, a false response is return to the caller, and the procedure ends (step S26). If AVClip y is not being played back and the file path of AVClip y is written in the stream storage location information file, on the other hand, AVClip y is set to the disable status. Also, a file attribute of a file storing AVClip y is set to Re-writable, to cancel Read Only Mode of AVClip y (step S24). After this, a success response is returned (step S25).

Figure 28:
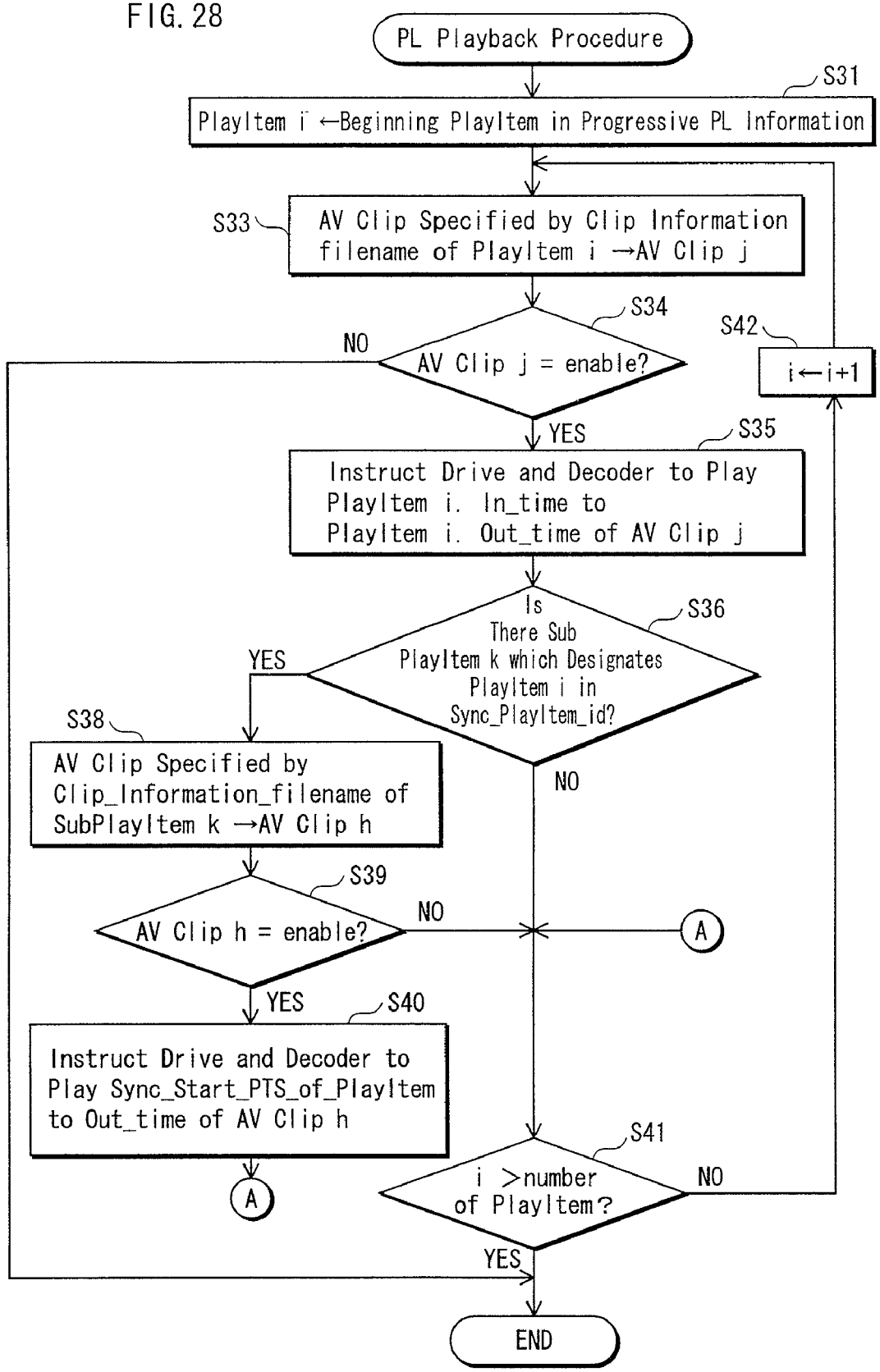
FIG. 28 is a flowchart of a playback procedure by a Playback Control Engine 32.

FIG. 28 is a flowchart showing a playback procedure by the Playback Control Engine 32. In this flowchart, a loop of steps S33 to S42 is performed with a beginning piece of PlayItem information in PlayList information being set as PlayItem i. A control variable in the loop of steps S33 to S42 is variable i. An operation of performing steps S33 to S42 and then incrementing control variable i is conducted until variable i exceeds a number of PlayItems (Number Of PlayItem) (step S41).

Steps S32 to S40 are described below. An AVClip shown in a Clip_information file_name in PlayItem information i is set as AVClip j (step S33), which is targeted for playback. Step S34 is a judgment as to whether AVClip j is in the enable status or not. If AVClip j is not in the enable status, the procedure is terminated at this point. If AVClip j is in the enable status, the drive device and the decoder are instructed to play AVClip j from a PlayItem.In_time to a PlayItem.Out_time (step S35).

Step S36 is a judgment as to whether there exists SubPlayItem k specifying PlayItem information i in Sync_PlayItem_id. If this SubPlayItem does not exist, the procedure directly moves to step S41. If the SubPlayItem exists, the AVClip shown by the Clip_information_file_name of SubPlayItem k is set as AVClip h (step S38), and a judgment is made as to whether AVClip h is in the enable status (step S39). If AVClip h is in the enable status, the drive device and the decoder are instructed to play AVClip h from a Sync_Start_PTS_of_PlayItem to Out_time, and then the procedure moves to step S41 (step S40).

Figure 29:
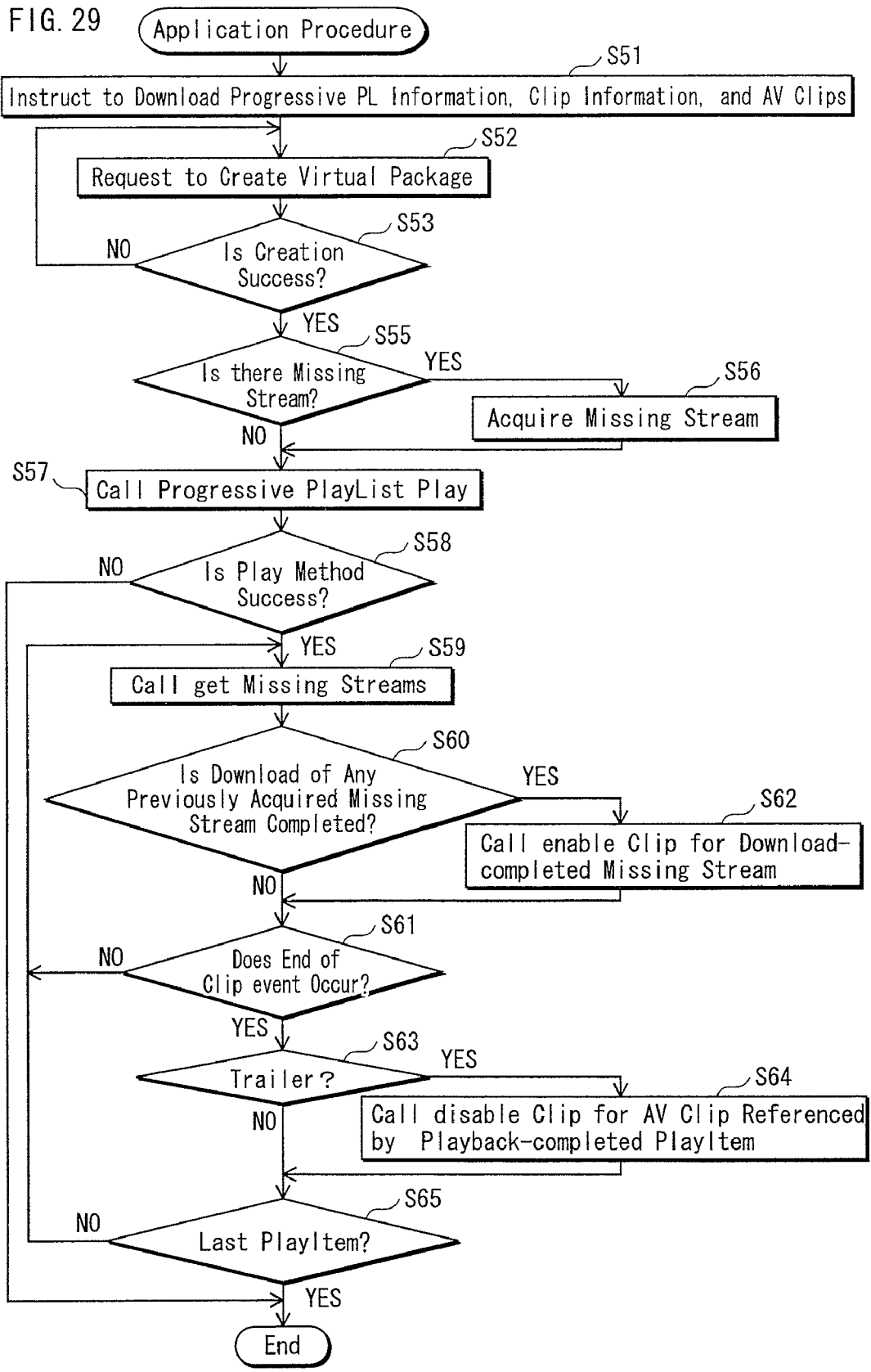
FIG. 29 is a flowchart of processing by an application.
Figure 30:
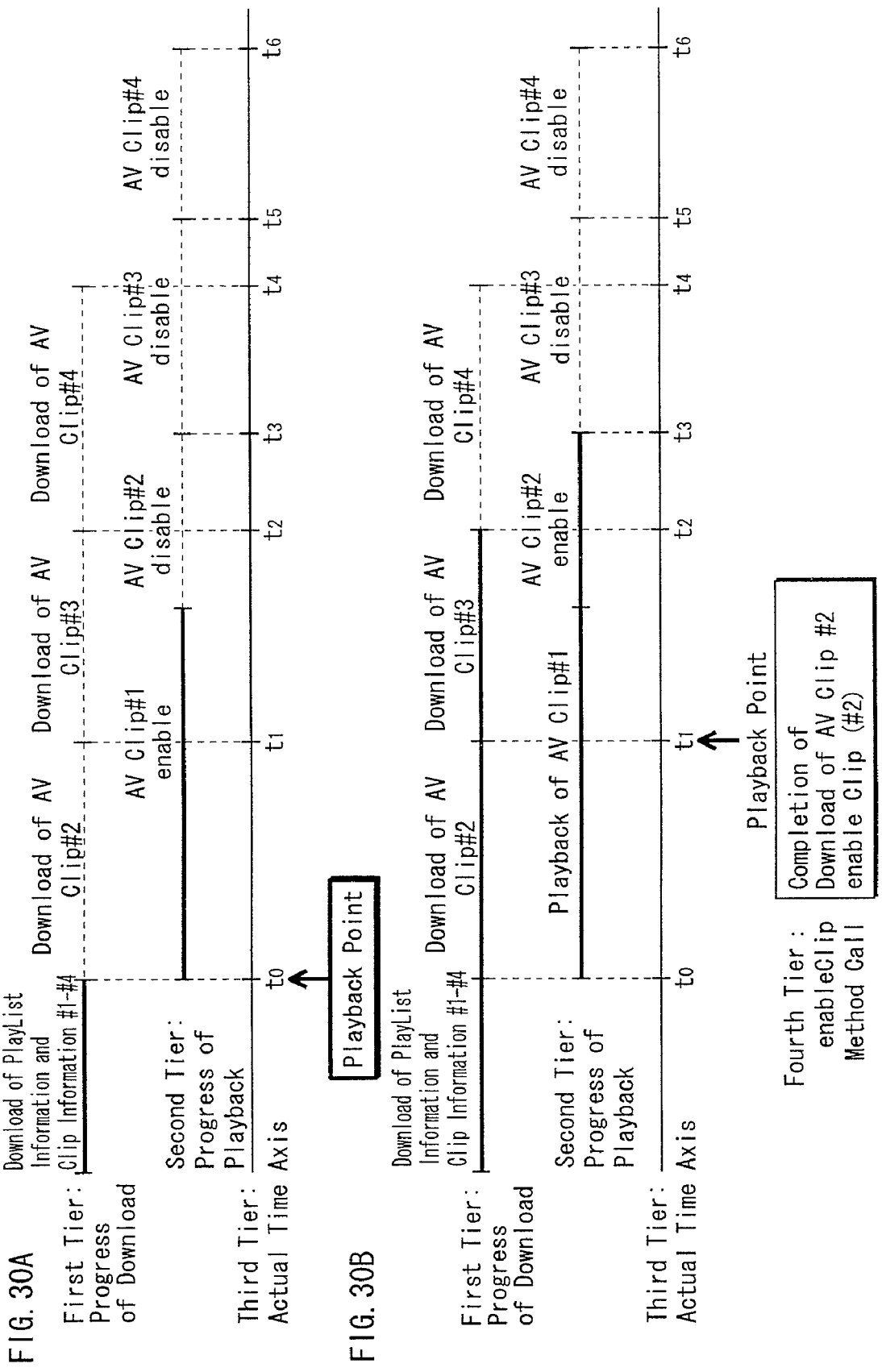
FIGS. 30A and 30B respectively show the progress of download by the network management module 37 and the progress of playback by the Playback Control Engine 32.
Figure 31:
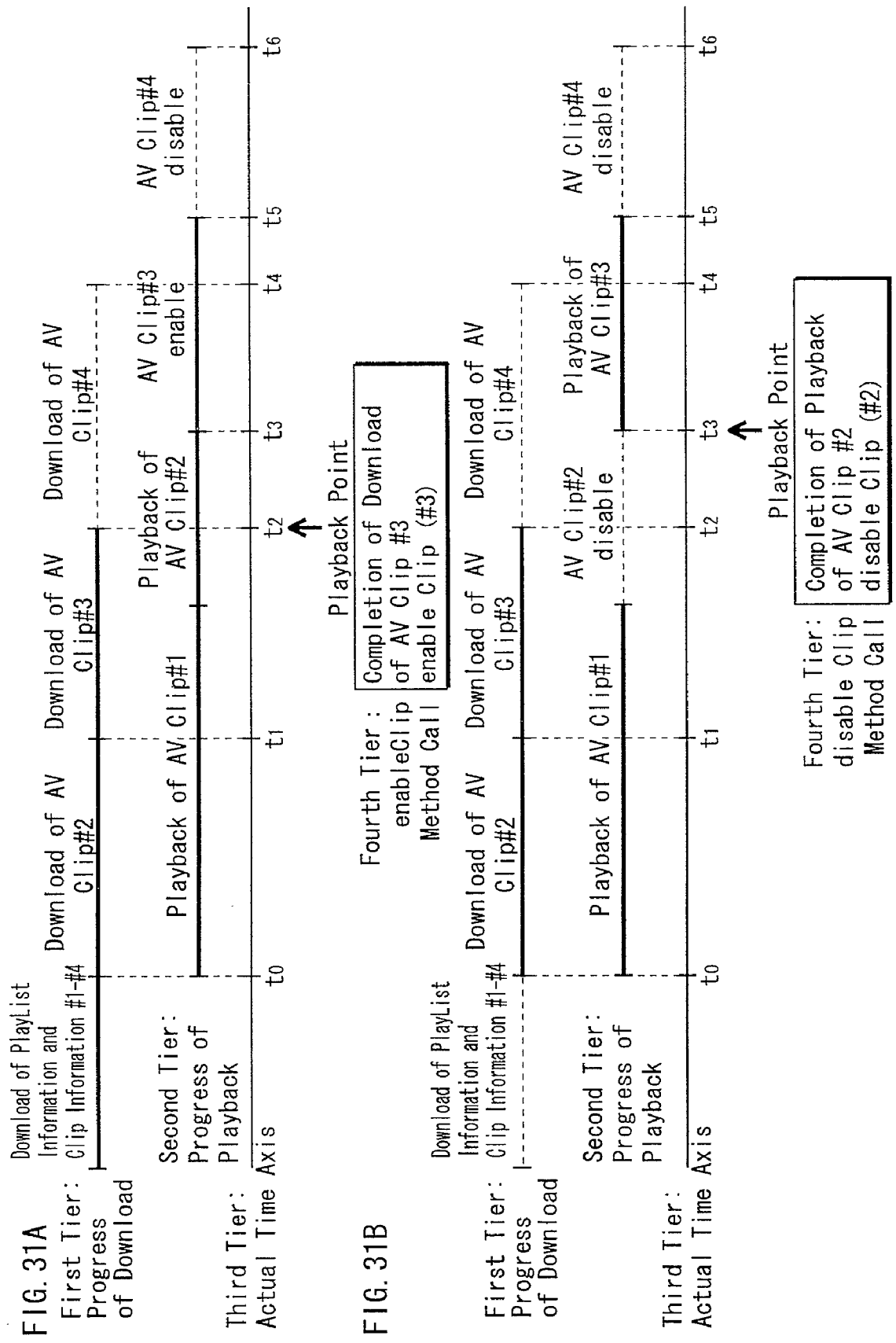
FIGS. 31A and 31B respectively show the progress of download by the network management module 37 and the progress of playback by the Playback Control Engine 32.
Figure 32:
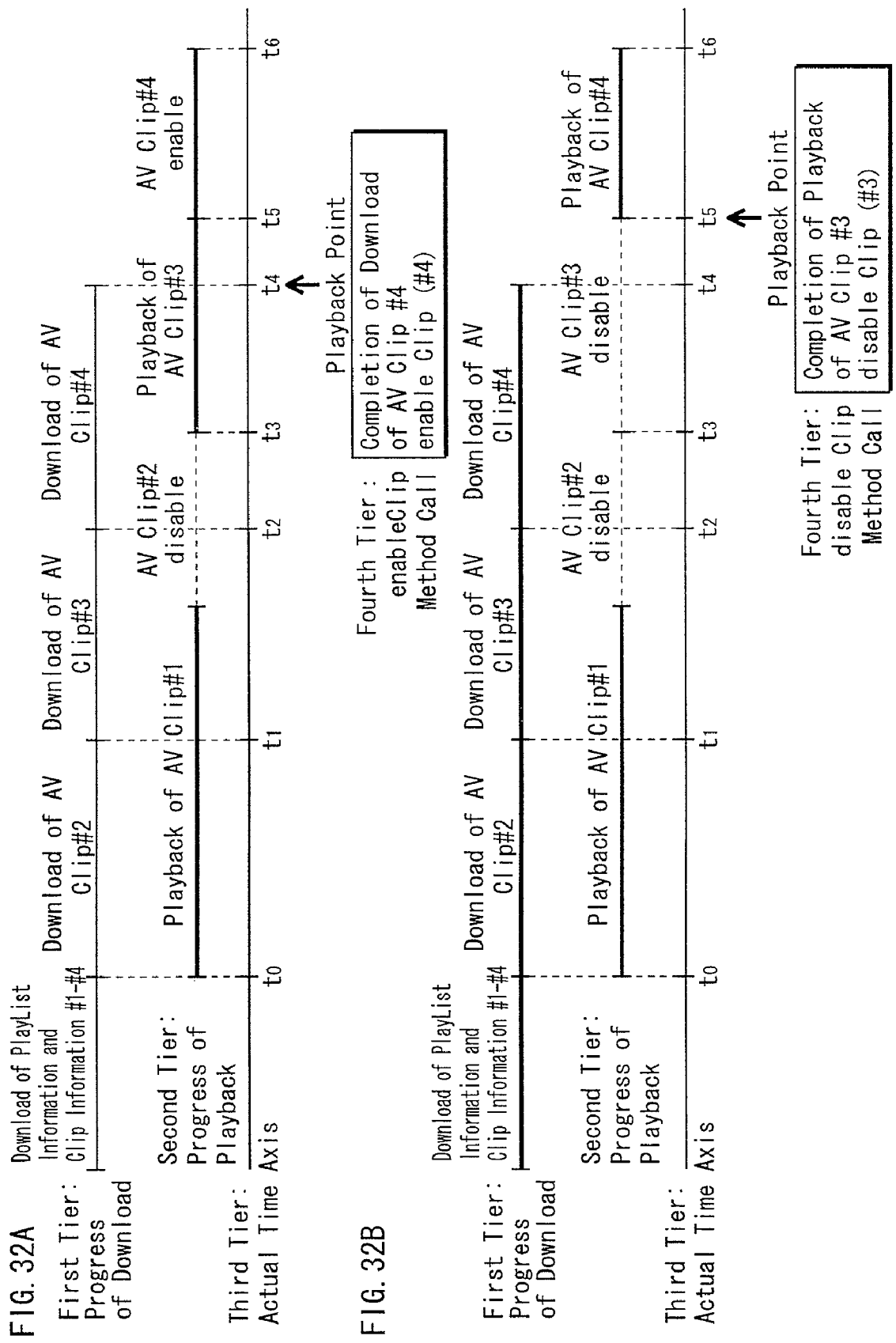
FIGS. 32A and 32B respectively show the progress of download by the network management module 37 and the progress of playback by the Playback Control Engine 32.

If AVClip h is not in the enable status, step S40 is skipped. A stream sequence defined by the PlayList information is played back as a result of this process being repeated for all of the PlayItem information constituting the PlayList information. FIG. 29 is a flowchart showing a procedure of an application. First, the application requests download of a stream storage location information file, PlayList information, Clip information, and AVClips (step S51). The application then requests creation of a Virtual Package (step S52). Step S53 is a judgment as to whether the creation request results in a success. The Virtual Package creation request is repeated until the Virtual Package creation results in a success.

Once the creation of the Virtual Package has resulted in a success, step S55 is performed. Step S55 is a judgment as to whether Virtual Package information contains any Missing Stream. In detail, if Clip information exists but an AVClip corresponding to the Clip information does not exist, that AVClip is acquired as a Missing Stream (step S56).

After this, a Play method of Progressive PlayList information is called in step S57, and a judgment is made as to whether the Play method results in success (step S58). If the Play method results in false, the procedure ends. If the Play method results in success, a loop of steps S59 to S61 is performed.

Step S59 is a call of the getMissingStreams method. Step S60 is a judgment as to whether, upon notification of a Missing Stream in response to the call of step S59, download of any previously acquired Missing Stream has completed.

Step S61 is a judgment as to whether an event showing completion of playback of an AVClip occurs. The application repeats steps S59 to S61 while the playback is being performed by the Playback Control Engine 32.

If there is an AVClip the download of which has completed in the above repetition (step S60: YES), the enableClip method is called for that Missing Stream which has been downloaded (step S62). This allows the AVClip which has been downloaded to be promptly set to the enable status.

If there is any AVClip the playback of which has completed (step S61: YES), the application judges whether that AVClip is a trailer or not. If the AVClip is a trailer, the application calls the disableClip method for the AVClip. This allows a trailer AVClip which has been played back, to be promptly set to the disable status.

<Operation>

An operation of the playback apparatus when playing back the PlayList information shown in FIG. 20 is described below. FIGS. 30 to 33 show the progress of download by the network management module 37 and the progress of playback by the Playback Control Engine 32. The first tier shows the progress of download by the network management module 37, and the second tier shows the progress of playback by the Playback Control Engine 32. The third tier shows an actual time axis, and the fourth tier shows method calls by the application.

As shown at the first tier, the download by the network management module 37 is composed of download of the PlayList information shown in FIG. 20, download of Clip information#1 to #4, and download of AVClips#1 to #4.

FIG. 30A: Current Time=Time t0

Time t0 is a time at which the download of the PlayList information and Clip information#1 to #4 has completed. Accordingly, the creation of a Virtual Package becomes possible. Since the PlayList information in the Virtual Package references AVClip#1 and AVClip#1 is in the enable status, the playback of the stream sequence begins at t0.

FIG. 30B: Current Time=time t1

Time t1 is a time at which the playback of AVClip#1 referenced by PlayList#1 is still in progress but the download of AVClip#2 has completed. Since the download of AVClip#2 has completed, AVClip#2 is no longer in the disable status. The application can set AVCilp#2 to the enable status by calling the enableClip method. As a result of the call, PlayItem#4 corresponding to AVClip#2 is targeted for playback.

FIG. 31A: Current Time=time t2

Time t2 is a time at which the playback of AVClip#2 referenced by PlayList#1 is still in progress but the download of AVCLip#3 has completed. Since the download of AVClip#3 has completed, AVClip#3 is no longer in the disable status. The application can set AVClip#3 to the enable status by calling the enableClip method. As a result of the call, PlayItem#5 corresponding to AVClip#3 is targeted for playback.

FIG. 31B: Current Time=time t3

Time t3 is a time at which the playback of AVClip#2 has completed. Since the playback of AVClip#2 has completed and AVClip#2 is a trailer, AVClip#2 referenced by the PlayItem can be subjected to deletion. This being so, the disableClip method is called for AVClip#2, to make AVClip#2 subjected to deletion. As a result, the Playback Control Engine 32 can treat AVClip#2 as nonexistent.

FIG. 32A: Current Time=Time t4

Time t4 is a time at which the playback of AVClip#3 referenced by PlayList#1 is still in progress but the download of AVClip#4 has completed. Since the download of AVClip#4 has completed, AVClip#4 is no longer in the disable status. The application can set AVClip#4 to the enable status by calling the enableClip method. As a result of the call, PlayItem#6 corresponding to AVClip#4 is targeted for playback.

FIG. 32B: Current Time=Time t5

Time t5 is a time at which the playback of AVClip#3 has completed. Since the playback of AVClip#3 has completed and AVClip#3 is a trailer, AVClip#3 referenced by PlayItem#5 can be subjected to deletion. This being so, the application makes AVClip#3 subjected to deletion by calling the disableClip method for AVClip#3. As a result, the Playback Control Engine 32 can treat AVClip#3 as nonexistent.

Figure 33:
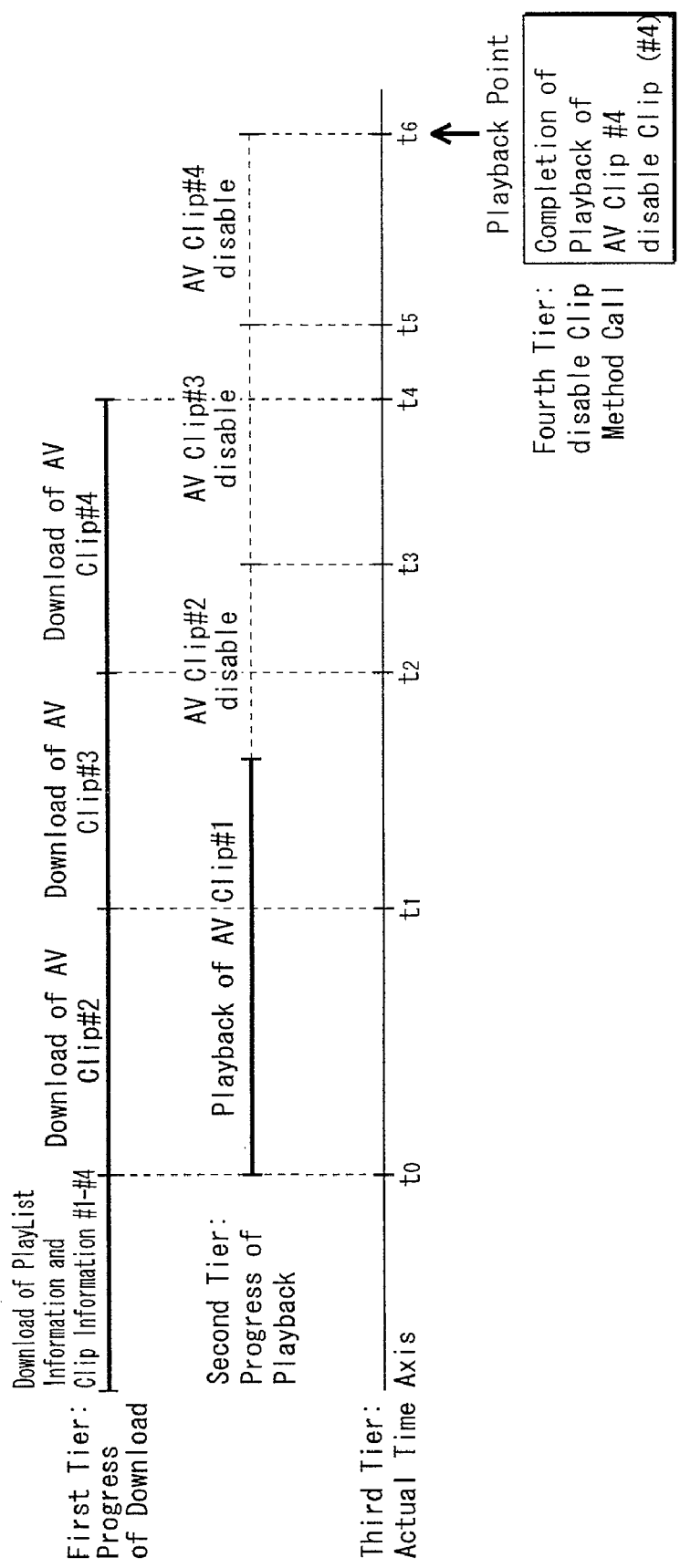
FIG. 33 shows the progress of download by the network management module 37 and the progress of playback by the Playback Control Engine 32.

FIG. 33: Current Time=Time t6

Time t6 is a time at which the playback of AVClip#4 has completed. Since the playback of AVClip#4 has completed and AVClip#4 is a trailer, AVClip#4 referenced by PlayItem#6 can be subjected to deletion. This being so, the application makes AVClip#4 subjected to deletion by calling the disableClip method for AVClip#4. As a result, the Playback Control Engine 32 can treat AVClip#4 as nonexistent.

According to this embodiment, the download by the network management module 37 and the playback by the Playback Control Engine 32 are performed in parallel, and a downloaded AVClip is changed from the disable status to the enable status to have the AVClip played by the Playback Control Engine 32. This makes it possible to realize "follow-up playback" of proceeding playback so as to follow the progress of download.

Also, any of the downloaded digital streams, the playback of which has completed, is changed from the enable status to the disable status, to have the played digital stream deleted. This makes it possible to realize "follow-up deletion" of proceeding the deletion so as to follow the progress of playback.

Thus, "follow-up playback" of proceeding playback so as to follow the progress of download and "follow-up deletion" of proceeding deletion so as to follow the progress of playback become possible. Therefore, even in the case where a communication rate of a communication line connecting the playback apparatus is low and a capacity of the Local Storage 18 internal to the playback apparatus is small, a digital stream recorded on the BD-ROM and a digital stream downloaded on the Local Storage 18 can be successively played back as one stream sequence.

Though the present invention has been described by way of the above embodiment, the present invention is not limited to such. The present invention can be realized with any of the following modifications. The invention of each of the claims of this application includes extension and generalization of the above embodiment and its modifications below. The degree of extension and generalization depends upon the state of the art in the technical field of the present invention at the time when this application was filed.

(A) The embodiment does not mention specific data structures of directory management information and file management information in the description of the Virtual FileSystem unit 38. However, in the case where the filesystem in the BD-ROM is prescribed by ISO/IEC 13346, the directory management information may be constituted by a "directory file" and a "file entry". The directory file is made up of a file descriptor showing a directory name of a subordinate directory and a file descriptor showing a file name of a subordinate file. The file entry is made up of a descriptor tag, an ICB tag, an allocation descriptor length, an extension attribute, and an allocation descriptor.

The file management information may be composed of file entries. The allocation descriptor shows a storage location of each extent constituting a file.

In this case, Virtual Package information is generated by adding a file descriptor of a file name of an AVClip on the Local Storage to a directory file corresponding to the STREAM directory in the volume management information of the BD-ROM, and adding a file entry of the AVClip on the Local Storage to under the STREAM directory in the volume management information of the BD-ROM.

(B) The embodiment describes the case where the BD-ROM is used as a recording medium. However, the present invention is applicable to any recording medium that is capable of recording an AVClip and PlayList information. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash™ card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive, and a hard disk drive internal to an apparatus.

(C) The embodiment describes the case where the playback apparatus decodes an AVClip recorded on the BD-ROM and outputs the decoded AVClip to the television. As an alternative, the playback apparatus may be equipped with only a BD-ROM drive, with the remaining construction elements being provided in the television. In this case, the playback apparatus and the television can be incorporated in a home network connected with an IEEE 1394 connector. The embodiment describes the case where the playback apparatus is connected to the television, but the playback apparatus may instead be integrated with a display device. Also, the playback apparatus may include only an element which constitutes an essential part of processing. Each of these forms of playback apparatus is an invention described in this specification. Accordingly, regardless of the form of the playback apparatus, an act of manufacturing a playback apparatus based on the internal structure of the playback apparatus described in the embodiment is an act of working of the present invention. Also, any act of assigning with charge (i.e. for sale) or without charge (i.e. as a gift), leasing, and importing the playback apparatus is an act of working of the present invention. Likewise, an act of offering for assignment or lease of the playback apparatus using storefront displays, catalogs, or brochures is an act of working of the present invention.

(D) Information processing using programs shown in the flowcharts is actually realized using hardware resources. Accordingly, the programs which describe the operational procedures shown in the flowcharts are themselves an invention. The embodiment describes the case where the programs are incorporated in the playback apparatus, but the programs can be implemented independently of the playback apparatus. Acts of working of the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(E) The time elements of the steps which are executed in a time series in each of the flowcharts can be regarded as the necessary elements of the present invention. This being so, a playback method shown by these flowcharts is an invention. If the processing shown in each flowchart is carried out by performing the steps in a time series so as to achieve the intended aim and the intended effect, this is an act of working of the recording method of the present invention.

(F) The embodiment describes the case where an AVClip is used as a digital stream recorded on the recording medium, but the present invention can also be realized with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, an MPEG-AAC audio stream, a dts audio stream, or a WMA (Windows™ media audio) audio stream.

(G) The movie work described in the embodiment may be obtained by encoding an analog video signal broadcast by analog broadcasting. Also, the movie work may be stream data constituted by a transport stream broadcast by digital broadcasting.

Alternatively, an analog/digital video signal recorded on a videotape may be encoded to obtain content. Also, an analog/digital video signal directly captured by a video camera may be encoded to obtain content. A digital work distributed by a distribution server is applicable too.

(H) The BD-J module 29b may be a Java™ platform that is embedded in an apparatus for receiving satellite broadcasts. When the BD-J module 29b is such a Java™ platform, the playback apparatus according to the present invention also performs processes as an STB for MHP.

Further, the BD-J module 29b may be a Java™ platform that is embedded in an apparatus for performing process control of a mobile phone. When the BD-J module 29b is such a Java™ platform, the playback apparatus according to the present invention also performs processes as a mobile phone.

(I) In a layer model, the HDMV mode may be positioned on the BD-J mode. Especially the analysis of the dynamic scenario in the HDMV mode and the execution of the control procedure based on the dynamic scenario put light load on the playback apparatus. Accordingly, there is no problem in executing the HDMV mode on the BD-J mode. Also, in the development of a playback apparatus or a movie work, operations can be guaranteed by only one mode.

Further, the playback process may be executed only in the BD-J mode. This is because playback controls can be performed in sync with playback of a PL in the BD-J mode, and therefore the HDMV mode may be omitted.

(J) An AVClip downloaded onto the Local Storage 18 may be bonus video or an interview of a producer or an actor.

(K) The embodiment describes the case where an application calls the getMissingStream method to check whether a Clip is a Missing Stream or Rewritable. Instead, Java™ libraries such as Java™.net and Java™.io may be used. In such a case, it is practical to use the following methods a), b), and c).

a) Analyze the contents of a Binding Unit Manifest File (stream location storage information) using XML Parser.

(Example of The Binding Unit Manifest File)

```
<Progressive>
<ProgressiveAsset VPFilename = "BDMV/STREAM/01000.m2ts">
                      ← identifier
<BUDAFile name = "1/1/streams/0.m2ts"></BUDAFile>
                            ← file path
  </ProgressiveAsset>
  <ProgressiveAsset VPFilename = "BDMV/STREAM/01001.m2ts">
    <BUDAFile name = "1/1/streams/1.m2ts"></BUDAFile>
  </ProgressiveAsset>
  <ProgressiveAsset VPFilename = "BDMV/STREAM/01002.m2ts">
    <BUDAFile name = "1/1/streams/2.m2ts"></BUDAFile>
  </ProgressiveAsset>
</Progressive>
```

Note that "BUDA" is an abbreviation of a Binding Unit Data Area which is an area in a Local Storage for storing files used for a Virtual Package.

b) Check whether xxxxx.m2ts exists in a file path (stream storage location) described in a Binding Unit Manifest File using Java™.io.

(Example)

```
new java (TM).io.File("1/1/streams/0.m2ts").exists( );
        // Missing Stream when false
``` c) Check whether a size of a file on a server matches a size of a file on a Local Storage using Java™.net, Java™.io, to judge completion of download.

(Example)

```
new java (TM).net.URL(http://xxx.com/vp_data/
  0.m2ts).openConnection( ).getContentLength( )
  == new java (TM).io.File("1/1/streams/0.m2ts").length( );
  // download can be judged as complete when match
```

Industrial Applicability

The playback apparatus according to the present invention may be used personally as in a home theater system. However, the playback apparatus according to the present invention may also be used industrially since the internal structure thereof is disclosed in the above embodiment and it is apparent that the playback apparatus according to the present invention will be manufactured in volume. For this reason, the playback apparatus according to the present invention has industrial applicability.

The invention claimed is:

1. An integrated circuit for use in a playback apparatus, the playback apparatus including a storage that stores a module having a function of a virtual machine for executing an application recorded on a recording medium, and playing a stream sequence including digital stream files that are stored on separate recording media, including a rewritable recording medium, the integrated circuit comprising:
- a central processing unit (CPU) that executes the module to cause the virtual machine to function; and
- a decoder that is distinct from the central processing unit (CPU) and that decodes a video stream and an audio stream that are included in the digital stream files stored on the recording media, wherein
- when the central processing unit (CPU) executes the module,
- the integrated circuit manages status information of the digital stream files, the status information indicating whether each of the digital stream files is in one of an enable status that is playable by the playback apparatus and a disable status that is unplayable by the playback, apparatus,
- if at least one of the digital stream files is in the enable status, the decoder decodes the at least one of the digital, stream files, and
- while the decoder decodes one of the at least one of the digital stream files that is in the enable status, the integrated circuit changes the status information of a remaining digital stream file that is recorded on the rewritable recording medium and is other than the one of the at least one of the digital stream files to one of the enable status and the disable status, according to a request from the application,
- the change to the enable status by the integrated circuit includes changing an attribute of the remaining digital stream file on the rewritable recording medium to a read-only attribute, and
- the change to the disable status by the integrated circuit includes changing the attribute of the remaining digital stream file on the rewritable recording medium to a rewritable attribute.

2. The integrated circuit as set forth in claim 1, wherein the decoder comprises:
- a video decoder that decodes the video stream included in the digital stream file; and
- an audio decoder that decodes the audio stream included in the digital stream file.

3. The integrated circuit as set forth in claim 1,
- wherein the application controls writing of the remaining digital stream file to the rewritable recording medium while the decoder decodes the one of the at least one of the digital stream files that is in the enable status,
- when writing of the remaining digital stream file to the rewritable recording medium is completed, the integrated circuit changes the remaining digital stream file to the enable status, and
- when playing of the remaining digital stream file recorded on the rewritable recording medium is completed, the integrated circuit changes the remaining digital stream file to the disable status.

* * * * *